(12) United States Patent
Walker et al.

(10) Patent No.: US 7,107,228 B1
(45) Date of Patent: *Sep. 12, 2006

(54) SYSTEMS AND METHODS WHEREIN A BUYER PURCHASES A PRODUCT AT A FIRST PRICE AND PHYSICALLY ACQUIRES THE PRODUCT AT A LOCATION ASSOCIATED WITH A MERCHANT THAT OFFERS THE PRODUCT FOR SALE AT A SECOND PRICE

(75) Inventors: Jay S. Walker, Ridgefield, CT (US); James A. Jorasch, Stamford, CT (US); Andrew S. Van Luchene, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 723 days.

This patent is subject to a terminal disclaimer.

(21) Appl. No.: 09/591,594

(22) Filed: Jun. 9, 2000

Related U.S. Application Data

(63) Continuation of application No. 08/889,503, filed on Jul. 8, 1997.

(51) Int. Cl.
*G06F 17/60* (2006.01)

(52) U.S. Cl. ...................................................... 705/26

(58) Field of Classification Search .................. 705/26, 705/27, 14
See application file for complete search history.

(56) References Cited

U.S. PATENT DOCUMENTS

| 3,691,527 | A | 9/1972 | Yamamoto |
| 4,237,537 | A | 12/1980 | Pitches et al. |
| 4,341,951 | A | 7/1982 | Benton |
| 4,554,446 | A | 11/1985 | Murphy et al. |
| 4,734,858 | A | 3/1988 | Schlafly ..................... 364/408 |
| 4,737,910 | A | 4/1988 | Kimbrow |
| 4,766,548 | A | 8/1988 | Cedrone et al. |
| 4,799,156 | A | 1/1989 | Shavit et al. ............... 364/401 |
| 4,882,675 | A | 11/1989 | Nichtberger et al. ........ 364/401 |
| 4,947,028 | A | 8/1990 | Gorog |
| 4,992,940 | A | 2/1991 | Dworkin .................... 364/401 |
| 5,010,485 | A | 4/1991 | Bigari ........................ 364/408 |

(Continued)

FOREIGN PATENT DOCUMENTS

CA 2070736 6/1992

(Continued)

OTHER PUBLICATIONS

Cyr, Diane "Double click on privacy", Catalog Age, V12, n9, Sep. 1, 1995. Retrieved from Dialog File: 15, Acc#: 01144345.*

(Continued)

*Primary Examiner*—Yogesh C. Garg
*Assistant Examiner*—Naeem Haq
(74) *Attorney, Agent, or Firm*—Magdalena M. Fincham

(57) ABSTRACT

Systems and methods are provided wherein a buyer purchases a product at a first price and physically acquires the product at a location associated with a merchant that offers the product for sale at a second price, the second price being different from the first price. Transaction information associated with the buyer and the merchant is received. Information that enables the buyer to physically acquire the product at a location associated with the merchant in exchange for providing payment of an amount based on the first price, such as by providing payment to a central controller, is transmitted. According to one embodiment, a central controller provides payment of an amount based on the second price to the merchant.

31 Claims, 15 Drawing Sheets

U.S. PATENT DOCUMENTS

| | | | |
|---|---|---|---|
| 5,064,999 A | 11/1991 | Okamoto et al. | |
| 5,117,354 A | 5/1992 | Long et al. | 364/401 |
| 5,176,224 A * | 1/1993 | Spector | 186/52 |
| 5,191,410 A | 3/1993 | McCalley et al. | 358/86 |
| 5,253,165 A | 10/1993 | Leiseca et al. | 364/407 |
| 5,256,863 A | 10/1993 | Ferguson et al. | 235/383 |
| 5,305,195 A | 4/1994 | Murphy | |
| 5,319,542 A | 6/1994 | King, Jr. et al. | 364/401 |
| 5,353,218 A * | 10/1994 | De Lapa et al. | 364/401 |
| 5,367,452 A | 11/1994 | Gallery et al. | |
| 5,375,055 A | 12/1994 | Togher et al. | 364/408 |
| 5,434,394 A | 7/1995 | Roach et al. | 235/375 |
| 5,452,344 A | 9/1995 | Larson | |
| 5,495,412 A | 2/1996 | Thiessen | |
| 5,513,117 A | 4/1996 | Small | |
| 5,515,268 A | 5/1996 | Yoda | 364/401 |
| 5,526,257 A | 6/1996 | Lerner | |
| 5,537,314 A | 7/1996 | Kanter | 364/406 |
| 5,546,316 A | 8/1996 | Buckley et al. | |
| 5,550,746 A | 8/1996 | Jacobs | |
| 5,557,518 A | 9/1996 | Rosen | 364/408 |
| 5,557,721 A | 9/1996 | Fite et al. | 395/148 |
| 5,590,197 A | 12/1996 | Chen et al. | 380/24 |
| 5,592,375 A | 1/1997 | Salmon et al. | |
| 5,592,378 A | 1/1997 | Cameron et al. | 395/227 |
| 5,611,051 A | 3/1997 | Pirelli | 395/210 |
| 5,612,527 A | 3/1997 | Ovadia | 235/383 |
| 5,631,724 A | 5/1997 | Sawada et al. | |
| 5,637,859 A | 6/1997 | Menoud | |
| 5,692,132 A | 11/1997 | Hogan | |
| 5,701,252 A | 12/1997 | Facchin et al. | |
| 5,708,782 A | 1/1998 | Larson et al. | |
| 5,710,886 A * | 1/1998 | Christensen et al. | 395/214 |
| 5,710,887 A | 1/1998 | Chelliah et al. | 395/226 |
| 5,713,795 A | 2/1998 | Kohorn | |
| 5,727,163 A * | 3/1998 | Bezos | 705/27 |
| 5,727,164 A | 3/1998 | Kaye et al. | |
| 5,734,150 A | 3/1998 | Brown et al. | |
| 5,739,512 A | 4/1998 | Tognazzini | |
| 5,754,653 A | 5/1998 | Canfield | |
| 5,758,328 A | 5/1998 | Giovannoli | 705/26 |
| 5,761,648 A | 6/1998 | Golden et al. | |
| 5,768,142 A | 6/1998 | Jacobs | 364/479.01 |
| 5,774,870 A | 6/1998 | Storey | 705/14 |
| 5,774,874 A | 6/1998 | Veeneman et al. | |
| 5,791,991 A | 8/1998 | Small | 463/41 |
| 5,794,207 A | 8/1998 | Walker et al. | |
| 5,799,284 A | 8/1998 | Bourquin | |
| 5,806,044 A | 9/1998 | Powell | 705/14 |
| 5,809,144 A | 9/1998 | Sirbu et al. | |
| 5,816,918 A | 10/1998 | Kelly et al. | |
| 5,822,736 A | 10/1998 | Hartman et al. | |
| 5,832,457 A | 11/1998 | O'Brien et al. | |
| 5,842,178 A | 11/1998 | Giovannoli | 705/26 |
| 5,845,259 A | 12/1998 | West et al. | 705/14 |
| 5,845,265 A | 12/1998 | Woolston | 705/37 |
| 5,848,399 A | 12/1998 | Burke | |
| 5,855,007 A | 12/1998 | Jovicic et al. | 705/14 |
| 5,857,175 A | 1/1999 | Day et al. | 705/14 |
| 5,864,604 A | 1/1999 | Moen et al. | |
| 5,870,716 A | 2/1999 | Sugiyama et al. | 705/26 |
| 5,870,717 A | 2/1999 | Wiecha | |
| 5,870,719 A | 2/1999 | Maritzen et al. | |
| 5,875,110 A | 2/1999 | Jacobs | |
| 5,878,139 A | 3/1999 | Rosen | |
| 5,878,401 A | 3/1999 | Joseph | |
| 5,883,810 A | 3/1999 | Franklin et al. | |
| 5,887,271 A | 3/1999 | Powell | 705/14 |
| 5,890,136 A | 3/1999 | Kipp | 705/22 |
| 5,890,137 A * | 3/1999 | Koreeda | 705/26 |
| 5,897,622 A * | 4/1999 | Blinn et al. | 705/26 |
| 5,907,830 A | 5/1999 | Engel et al. | 705/14 |
| 5,923,016 A | 7/1999 | Fredregill et al. | |
| 5,924,078 A | 7/1999 | Naftzger | 705/16 |
| 5,924,080 A | 7/1999 | Johnson | 705/26 |
| 5,924,082 A | 7/1999 | Silverman et al. | 705/37 |
| 5,960,411 A * | 9/1999 | Hartman et al. | 705/26 |
| 5,963,939 A | 10/1999 | McCann et al. | |
| 5,970,469 A * | 10/1999 | Scroggie et al. | 705/14 |
| 5,988,346 A | 11/1999 | Tedesco et al. | |
| 6,014,634 A | 1/2000 | Scroggie et al. | |
| 6,035,284 A | 3/2000 | Straub et al. | |
| 6,038,551 A | 3/2000 | Barlow et al. | |
| 6,055,514 A * | 4/2000 | Wren | 705/27 |
| 6,058,373 A | 5/2000 | Blinn et al. | |
| 6,058,375 A | 5/2000 | Park | |
| 6,061,660 A | 5/2000 | Eggleston et al. | |
| 6,073,840 A | 6/2000 | Marion | |
| 6,085,168 A | 7/2000 | Mori et al. | |
| 6,119,099 A | 9/2000 | Walker et al. | |
| 6,131,085 A | 10/2000 | Rossides | |
| 6,134,534 A | 10/2000 | Walker et al. | 705/26 |
| 6,167,382 A | 12/2000 | Sparks et al. | |
| 6,192,349 B1 | 2/2001 | Husemann et al. | |
| 6,193,154 B1 | 2/2001 | Phillips et al. | |
| 6,193,155 B1 | 2/2001 | Walker et al. | |
| 6,199,014 B1 | 3/2001 | Walker et al. | |
| 6,205,435 B1 | 3/2001 | Biffar | |
| 6,236,971 B1 | 5/2001 | Stefik et al. | |
| 6,247,047 B1 | 6/2001 | Wolff | |
| 6,249,772 B1 | 6/2001 | Walker et al. | |
| 6,260,024 B1 | 7/2001 | Shkedy | |
| 6,266,651 B1 | 7/2001 | Woolston | |
| 6,330,544 B1 | 12/2001 | Walker et al. | |
| 6,370,513 B1 | 4/2002 | Kolawa et al. | |
| 6,512,570 B1 | 1/2003 | Garfinkle et al. | |

FOREIGN PATENT DOCUMENTS

| | | |
|---|---|---|
| CA | 2217739 | 10/1996 |
| EP | 0 370 146 A1 | 5/1990 |
| EP | 779587 A2 | 6/1997 |
| EP | 779587 A3 | 6/1997 |
| EP | 0 817 138 A1 | 1/1998 |
| FR | 2 733 068 A1 | 10/1996 |
| JP | 6035946 | 2/1994 |
| JP | 7078274 | 3/1995 |
| JP | 272012 | 10/1995 |
| JP | 08137951 | 5/1996 |
| JP | 8221484 | 8/1996 |
| JP | 9097288 | 4/1997 |
| JP | 11088560 A | 9/1997 |
| JP | 10187820 | 7/1998 |
| JP | 10214284 | 8/1998 |
| JP | 10240830 | 9/1998 |
| JP | 10269049 | 10/1998 |
| WO | WO 96/32701 | 10/1996 |
| WO | WO 97/16797 A1 | 5/1997 |
| WO | WO 97/16897 A1 | 5/1997 |
| WO | WO 97/21200 A2 | 6/1997 |
| WO | WO 97/23838 A1 | 7/1997 |
| WO | WO 97/35441 | 9/1997 |
| WO | WO 97/44749 | 11/1997 |
| WO | WO 98/06050 A1 | 2/1998 |
| WO | WO 98/15907 A1 | 4/1998 |
| WO | WO 98/19260 | 5/1998 |
| WO | WO 98/21713 A2 | 5/1998 |
| WO | WO 98/48388 | 10/1998 |
| WO | WO 98/48563 A1 | 10/1998 |
| WO | WO 98/49658 A1 | 11/1998 |
| WO | WO 99/04326 | 1/1999 |
| WO | WO 99/07121 | 2/1999 |

WO    WO 99/09508    2/1999

OTHER PUBLICATIONS

Prewitt, Milford "Internet security providers pushing to ease jitters of online marketers", Nation's Restaurant News, v30, N34, Sep. 2, 1996. Retrieved from Dialog File: 15, Acc#: 01282540.*
"http://web.archive.org/web/19961029153454/www.autobytel.com/march12.html" retrieved on Nov. 19, 2004.*
Godwin, Nadine, "New software was key lure in $17 million agency buyout.", Travel Weekly, Nov. 26, 1984, Section: vol. 43, p. 45, ISSN: 0041-2082.
Tellis, Gerald J., "Beyond the Many Faces of Price: An Integration of Pricing Strategies", Journal of Marketing, Oct. 1986, pp. 146-160.
Kuttner, Robert, "Computers May Turn the World into One Big commodities Pit.", Business Week, Sep. 11, 1989, Section: Economic Viewpoint, No. 3123, p. 17.
Del Rosso, Laura, "Firm proposes ticket-bidding system; Marketel explores electronic auction of travel; Marketel International", Travel Weekly, Nov. 13, 1989, Section: No. 91, vol. 48, p. 1, ISSN: 0041-2082.
Weatherford, Lawrence R. and Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844.
Spencer, Milton H. and Amos, Jr., Orley M., "Contemporary Economics, Eight Edition", Worth Publishers, Copyright 1993.
Rajendran, K.N. and Tellis, Gerard J., "Contextual and Temporal Components of Reference Price", Journal of Marketing, Jan. 1994, pp. 22-34.
Bronnenberg, Bart J., "Limited Choice Sets, Local Price Response, and Implied Measures of Price Competition", Journal of Marketing Research, Spring 1996, Section: vol. XXXIII, p. 163.
Adyanthaya, Surain, "Revenue Management: the Black Art." Interavia Business & Technology, Sep. 1998, Section: No. 623, vol. 53, p. 43, ISSN: 0983-1592.
Woolley, Scott, "I got it cheaper than you", Forbes, Nov. 2, 1998, Section: Management, Strategies, Trends, p. 82.
Press Release, "Priceline.com Delivers Savings For Flexible Travelers In Side-By-Side Price Compairson", Priceline.com, Stamford, CT, May 28, 1999.
Website: "Pricing, The Professional Pricing Society Conference Agenda", (http //www pricing-advisor com/conf_agn htm), download date: Jun. 19, 1999.
Odlyzko, Andrew, "The Bumpy Road of Electronic Commerce", (http //aace Virginia edu/aace/conf/webnet/html/ao htm), download date: Jul. 1, 1999.
Website: "DealTime com: The Ultimate Online Shopping Service", (http www dealtime com/about/aboutbodyhome asp?B=dealtime &AID=0), download date: Oct. 20, 1999.
Kephart, Jeff, "Price Dynamics of Vertically; Introduction", (http //www research ibm com/infoecon...), download date: Nov. 11, 1999.
Website: "Frictionless Commerce Incorporated: Solutions", (http www frictionless com/solutions html), download date: Nov. 11, 1999.
Website: "United Buying Service", (http //www inform umd edu/muc/clubinfo/ubs html), download date: Apr. 14, 2003.
Office Action for U.S. Appl. No. 09/348,566, Examiner James Zurita, mailed Oct. 1, 2003, pp. 3-5.
Supplementary European Search Report, completed Feb. 28, 2005, European Application No. EP 98 93 3186, entitled "Systems And Methods Wherein A Buyer Purchases A Product At A First Price And Acquires The Product From A Merchant That Offers The Product For Sale At A Second Price", filed Jan. 28, 2000, in the name of Walker et al.
Quinn, Jane Bryant, "New Cars for Less", Newsweek, Oct. 23, 1978, The Columnists Section at p. 80.
Joseph, Anthony, "Baby the Engine, and Other Savings Tips", The Christian Science Monitor, Nov. 4, 1986, Autos '87 Pullout Section at p. B10.

Evans, Judith, "Who Was That Masked Cybershopper?; MasterCard-VISA Agreement on Credit Card Security May Make On-Line Commerce Fly", The Washington Post, Feb. 2, 1996, Financial Section at p. F01.
Hilts, Paul, Technology Meets Commerce; Electronic Publishing; Includes Articles on the World Wide Web and the Annual Military Book Show; ABA "96", Publishers Weekly, Jul. 8, 1996, vol. 243, No. 28 at p. 43; ISSN: 0000-0019.
Shea, Barbara, "Read Fine Print When Comparing Car Rentals", St. Louis Post-Dispatch, Feb. 9, 1997, Travel & Leisure Section at p. 04T.
"About CyberSlice", (http://www.cyberslice.com/cgi-bin/WebObjects/). Download date: May 6, 1997.
"The Easy, Pain Free Way To Buy Or Lease Your Next Car!", (http://www.autoseek.com/#what), download date: May 28, 1997.
"My Auto Broker—Online Auto Broker", (http://www.adverlink.com/myautobroker/), download date: May 28, 1997.
"Price Watch Services", (http://icon.co.za/-robo/prod01.htm), download date: Jun. 9, 1997.
PCT International Search Report for International Application No. PCT/US98/13977 mailed Oct. 19, 1998.
PCT Written Opinion for PCT International Application No. PCT/US98/13977 mailed Jul. 1, 1999.
"Welcome to cool savings.com", (coolsavings.com) , copyright 1996-1999.
"Groceries Online", (http://www.groceries-online.com/), download date: Aug. 3, 1999.
"SaveSmart—How SaveSmart Works for Consumers", (http://www.savesmart.com/consumer/consumer_howitworks.html), download date: Jan. 17, 1999.
"Welcome to planet U, providers of U-pons—Internet Coupons", (http://www.planetu.com/), download date: Mar. 16, 1999.
"Reaching Out in New Directions"; Introducing USA Value Exchange, First Data Corporation Brochure, 1996-1997.
Naik, Gautam, "In Digital Dorm, Click on Return for Soda", The Wall Street Journal Online, undated.
"Brother Industries is pushing ahead with its new PC software vending machine operation in a bid to boost revenues in the filed to 10 billion yen by 1995", IDC Japan Report, Aug. 30, 1991, Section: vol. 17, p. 53.
"FAQ: CSH Coke Machine Information", FAQ, May 23, 1994, vol. 1.2, (http //www cs uu nl/wais/html/na-dir/csh-coke-machine-info html).
"Six Vendors Sign on For Early Electronic Commerce Venture", Voice Technology News, Dec. 13, 1994, Section: No. 25, vol. 6, ISSN: 1045-1498.
Maras , Elliot, "1995: downsizing adds costs; new strategies sought", Automatic Merchandiser, Aug. 1996, pp. 20-22, 24, 26, 28, 30, 32, 34, 36, 38, 40, 44, Section: State of the Industry Report.
"First Virtual Holdings Releases Beta Software for Secure Transactions On Microsoft Merchant Server", PR Newswire Mar. 31, 1997, Section: Financial News.
Website: "Computer Science House: Projects: Drink Machine", (http //www csh rit edu/proj/drink html), download date: Jan. 29, 1998.
Desjardins, Doug, "Hollywood's investment in online video retailer gets mixed reviews", Video Store, Aug. 9, 1998, vol. 20, No. 32, p. 1+, ISSN: 0195-1750.
Tooher, Nora Lockwood, "Macy's new gift card gets trial run in Warwick", the Providence Journal-Bulletin, Oct. 1, 1998, Section: Business, p. 1E.
Website: "A Personal Shopping Organizer for the Web Savvy Consumer.", KILLERAPP, (http //www killerapp com/html/main/pr0004 html), Oct. 2, 1998.
Caruso, Denise, "Digital Commerce; The boom in on-line shopping adds a twist to the old quandary of how to tax interstate purchases.", The New York Times, Dec. 28, 1998, Section: C, p. 3, col. 5, Business/Financial Desk.
Fallon, James, "Safeway Puts Ordering into Customers' Palms", Executive Technology, Jan. 1999.
Website: "WebVoucher Form", (http //www pinex co uk/webvoucher/), download date: Mar. 14, 1999.

Website: "WEBCERTIFICATE.COM", (http //www webcertificate com:80/webcert/default asp), download date: May 20, 1999.

"Kmart Expands Inventory Via In-Store Kiosks" RTnews, (www retailtech com), Jun. 1999, p. 20.

Lazarus, David, "E-Commerce, Japanese Style", Wired Online, (http //www wired com), Jun. 7, 1999.

Website: "Mercata—Group Buying Power", (http www mercata com/cgi-bin/mercata/mercata/v1/pages/home jsp), download date: Jun. 7, 1999.

"Wal-Mart vs. Amazon: The fight begins", Yahoo News, (http //www yahoo com), Jun. 9, 1999.

"Circuit City to Integrate E-Commerce With Store Shopping: Retailer's E-Superstore—www Circuitcity com—to Open in Jul.", PR Newswire, Jun. 15, 1999, Section: Financial News.

Frederick, James, "Walgreens gears for opening of its own Internet pharmacy", Drug Store News, Jul. 19, 1999, vol. 9, No. 7.

Website: "Welcome to 1-800-FLOWERS", (http //www 1800flowers com/flowers/welcome asp), download date: Aug. 3, 1999.

"Internet Wine Gift Company Offers Answer to Recent Legislation", Source: Send.com, Aug. 10, 1999.

\* cited by examiner

| ITEM NUMBER | QUANTITY AVAILABLE |
|---|---|
| 4956323 | 45 |
| 4956324 | 7 |
| 4956325 | 32 |

| ITEM NUMBER | ITEM DESCRIPTION | MANUFACTURER | MODEL | PRICE | STORE ID NUMBER | QUANTITY AVAILABLE |
|---|---|---|---|---|---|---|
| 4956523 | FOUR HEAD VCR | SONY | TS-131 | $349.99 | 32449 | 45 |
| 15978TS | FOUR HEAD VCR | SONY | GTR-1600 | $349.99 | 31790 | 58 |
| 4956323 | FOUR HEAD VCR | SONY | TS-131 | $349.99 | 32439 | 23 |

FIG. 6A

| POS CONTROLLER ID | STORE NAME | ADDRESS | STORE ID NUMBER |
|---|---|---|---|
| 32439 | SEARS | 1322 RED ST. ATLANTA, GA | 32439 |
| 32440 | WALMART | 1291 BLUE ST. ATLANTA, GA. | 32440 |
| 32449 | CALDORS | 123 ELM ST. STAMFORD, CT | 32449 |
| 31790 | TARGET | 1297 HARD RD. PHOENIX, AZ | 31790 |

| CUSTOMER NAME | REGISTERED USER ID NUMBER | CREDIT CARD NUMBER | EXP. DATE | PHONE NUMBER | E-MAIL ADDRESS | ADDRESS |
|---|---|---|---|---|---|---|
| BILL SMITH | 1325464213 | 1111-1111-1111-1111 | 09/99 | (410) 860-2719 | SMITH@AOL.COM | 1297 RED ST. ATLANTA, GA |
| ANDREW BROWN | 1325464214 | 2222-2222-2222-2222 | 07/99 | (961) 789-9000 | BROWN@AOL.COM | 1421 BLUE ST. PHOENIX, AZ |
| BETTY CARDOW | 1325464215 | 3333-3333-3333-3333 | 02/98 | (343) 899-0099 | CARD@WEBTV.NET | 1191 ANVIL DR. NORWALK, CT |

FIG. 6C

| ITEM NUMBER | CREDIT CARD NUMBER | EXPIRATION DATE | TRANSACTION DATE | POS CONTROLLER ID |
|---|---|---|---|---|
| 6TR-1600 | 1111-1111-1111-1111 | 5/28/97 | 5/26/97 | 31790 |
| HK-057 | 2222-2222-2222-2222 | 5/28/97 | 5/26/97 | 32439 |
| 4956323 | 3333-3333-3333-3333 | 5/29/97 | 5/26/97 | 32449 |

| CREDIT CARD NUMBER | POS CONTROLLER ID | ITEM NUMBER | PRICE | TRANSACTION DATE | EXP. DATE | STORE ID NUMBER |
|---|---|---|---|---|---|---|
| 1111-1111-1111-1111 | 31790 | 6TR-1600 | $349.99 | 5/26/97 | 5/28/97 | 31790 |
| 2222-2222-2222-2222 | 23439 | HK-057 | $105.99 | 5/26/97 | 5/28/97 | 32439 |
| 3333-3333-3333-3333 | 32449 | 4956323 | $329.99 | 5/26/97 | 5/29/97 | 32449 |

R1, R2, *R3 → (rows); 406

FIG. 7

SYSTEMS AND METHODS WHEREIN A BUYER PURCHASES A PRODUCT AT A FIRST PRICE AND PHYSICALLY ACQUIRES THE PRODUCT AT A LOCATION ASSOCIATED WITH A MERCHANT THAT OFFERS THE PRODUCT FOR SALE AT A SECOND PRICE

The present application is a continuation of U.S. patent application Ser. No. 08/889,503 filed Jul. 8, 1997; which issued as U.S. Pat. No. 6,249,772 on Jul. 19, 2001.

BACKGROUND OF THE INVENTION

1. Field of the Invention

The present invention relates to systems and methods wherein a buyer purchases a product at a first price, such as by purchasing the product online, and physically acquires the product at a location associated with a merchant, such as a local retailer, that offers the product for sale at a second price.

2. Description of the Related Art

The retail system as practiced today represents the principal system for the sale and distribution of over one trillion dollars per year in goods and services. It is a process that has developed over the past several decades with well-defined, traditional roles for its various participants: manufacturers, distributors, and retailers.

As the retail process has developed and is currently practiced, a manufacturer has the responsibility for designing, manufacturing (or having made) and selling products to a distributor/retailer. The manufacturer's price, also known as the factory price, is typically set sufficient to recoup costs of manufacturing, plus to return a profit to the manufacturer.

The distributor function, when utilized, is to efficiently and cost-effectively move products from the manufacturer to the retailer. The retailer's responsibilities include product distribution, retail pricing, and direct customer sales and services. As will be understood from a further consideration of the invention as described below, the present invention is directed to systems and processes which enable the manufacturer to significantly affect the ultimate price of his products to the consumer.

As will be appreciated by those skilled in the art of retailing, pricing represents one of the most critical aspects of the retail process. Product pricing directly affects consumer demand, which in turn affects product movement, profitability, and the subsequent business directions and strategies of the various participants in the process. Historically, however, customer pricing has remained almost totally within the purview of the retailer. As will be seen below, the ability to affect product retail prices is highly desirable to and has been the focus of many different manufacturer efforts over the years.

Once a product enters into the channel, distributors and retailers are motivated by their own goals and measurements, which directly affect product pricing, and which may differ significantly from those of the manufacturer. As the ultimate determinant of the retail price, the retailer is typically motivated to sell goods in a manner that realizes the highest profit margins for his business.

Thus, while a manufacturer is constantly striving towards his own goals, for example to sell more products, improve current products, develop new products, or distribute newly developed and manufactured goods, he has been consistently lacking in one of the key tools most effective in obtaining these goals—the customer pricing of his product.

Not only does a manufacturer lack control over retail pricing, but his channel often uses their control over pricing to directly conflicting ends. A manufacturer, for example, may be lowering a distribution price to motivate the sale of an expiring product line, while the retailers are maintaining high customer prices to maximize profit. Such an artificially high retail price could subsequently result in a glut of highly discounted, left over old product that is in direct competition with the subsequently introduced new product. In fact, a typical retailer carries brands from competing manufacturers, and thus may work against one manufacturer in favor of a direct competitor.

In the course of the development of the retail process, manufacturers have attempted to implement many different methods of exercising more control over retail pricing. At one time, for example, manufacturers were permitted to set minimum retail prices, and to require the sale of tied product combinations. Today, of course, such practices have been deemed illegal as anti-competitive. Regardless, they still did not yield the level of control that manufacturers desired.

Another attempt to exert control over retail pricing is seen in manufacturers' efforts to manipulate customer price through the use of paper discount coupons. In theory, such coupons permit a manufacturer to affect the final net price to the buyer, thereby affecting the sale of selected products. Again in theory, such coupons can not only target selected products, but geographic regions and even, through appropriate distribution of the coupons, selected customers.

In practice, however, coupons have been found to be extraordinarily ineffective. Tens of billions are often printed to generate a paltry two or three percent use rate. Coupon distribution is, as a practical matter, uncontrollable. The manufacturer coupon represents, at best, an expensive, unwieldy, and poorly effective method by which the manufacturer can exert minimal control over the retail price.

Manufacturer rebates are another program by which manufacturers attempt to influence retail pricing. Rebates suffer from the same problems as coupons; they are expensive, untargeted, and have the further problem of being inconvenient for the consumer to use. Like coupons, rebates exert a relatively modest affect on the retail price.

In more industrious and extensive attempts to manage the retail process, manufacturers have participated directly as retailers through activities such as factory outlets and direct catalog sales. Factory outlets, while of limited success in moving 'seconds' (e.g. defective goods) and expiring product lines, create very significant problems which limit their further use. In their most negative aspect, factory outlets place manufacturers into direct competition with their channels, creating ill will, and often direct conflict their retail partners.

Catalog sales suffer the same problem as manufacturer outlets. Further, both efforts—factory outlets and catalog sales—require a manufacturer to enter and compete directly in the field of direct-to-customer sales. Such direct participation in customer sales requires a significant investment in resources, and business which manufacturers typically have not been required to develop. More specifically, manufacturers often do not possess retail skills in the traditional areas of distribution, marketing, and direct customer support necessary to compete effectively in direct customer sales. JCPenney is an example of a retailer who, through the focused utilization of both retail and direct marketing skills, has developed a highly successful catalog business. The success of the JCPenney operation, where catalog orders may be collected through a local retail outlet, has been credited in large part to the application of local store retail skills to the catalog portion of the business. Such retail skills directly illustrate what most manufacturers are lacking.

In addition to the problems described above, catalog sales and related indirect sales suffer from the drawback of making the customer wait for delivery of a product. Associated with any direct retail sale is the well-recognized feeling of instant gratification felt by the customer when exiting the store with the product in hand. When a product is ordered through a paper or electronic catalog (or other indirect channel such as a catalog store), the customer is forced to wait from one day to several weeks to receive delivery of the purchased goods. Not only does this wait diminish any feelings of instant gratification, but it will almost certainly discourage impulse purchases, and may even discourage the customer from purchasing any goods at all.

The advent of new technologies, such as electronic communications and the Internet, have enabled substantial improvements and enhancements to many phases of the retail process as described above. However, to the best knowledge of applicants, uses of such enabling technologies are generally limited to enhancing and improving the conventional retail process paradigm. No uses that are known to applicants permit or enable a manufacturer to significantly, or more directly affect customer price. Further, in most instances known to applicants, enabling retail technology has been applied to the benefit of the retailer, and not the manufacturer.

As one example of the application of technology for the benefit of the manufacturer, the traditional coupon process described above has been implemented online to provide electronic coupons. However, not only do such coupons suffer many of the drawbacks described above with respect to traditional coupons, but they require printing by the consumer and hence are less convenient for most customers to use. They are also easily susceptible to fraud and counterfeiting, especially by those possessing the computer systems and expertise necessary to locate and print them.

Another application of new technology to an old sales paradigm for the benefit of the manufacturer is the implementation of an online sales 'site' (i.e. an electronic web page or web site). As practiced by a manufacturer, such a website typically takes the form of an on-line catalog or 'mall'. While yielding the manufacturer direct control of the retail process, such activities subject him to the same drawbacks and problems encountered with outlets and direct catalog sales as discussed above.

Examples of retail systems that use Internet technologies to supplement known sales processes for retailers include CYBERSLICE, a pizza sales system wherein buyers order pizza on the net at store-set prices, and subsequently pick up the pizzas at the store. PEAPOD is an example of an Internet subscription grocery service wherein orders placed over the net are, for a fee, filled by PEAPOD and delivered from a local grocery. Further websites exist where franchisers and franchisees advertise the costs of goods and/or services, with fulfillment being conventionally through the franchisee/retailer.

Another arena where technology has improved the retail process is that of reservation-type businesses typically practiced by distributed chains or franchises. Such businesses include, for example, hotels and automobile rental companies. A customer wishing, for example, to make a reservation at a Hyatt hotel may contact a central Hyatt authority, or a local Hyatt hotel. A price is determined, and the inventory records of both the Hyatt authority and the local Hyatt hotel are updated to reflect the reservation. Technology including the Internet and other computer network and communications systems functions to increase user access to the goods and services, and to improve inter-company processes and communications. Such business models permit a central authority such as a franchiser to have some affect on customer pricing. However, these business models represent 'closed' systems where product and services prices are agreed upon and limited to application within the particular franchise arrangement or company.

In all systems currently known to applicants, whether implemented with time-tested processes or state-of-the-art technologies, the sales paradigm remains traditional; the manufacturer surrenders substantially all control over the retail pricing of his products and services in exchange for access to the skills of the retailer. As discussed above, these skills are typically focused in the areas of product distribution and marketing, and customer support.

There thus exists a need for a truly new and effective sales and distribution system which permits a manufacturer to legally and effectively exert control over the ultimate price to the customer of his goods and services. Such a system should desirably operate cooperatively with retailers, preferably utilizing the strengths of the both the manufacturers and retailers. Such a system should enable a manufacturer to manipulate the customer price sufficiently to meet his own goals, while preferably maintaining the goodwill and profitability of the distributors and retailers.

SUMMARY OF THE INVENTION

It is an object of the present invention to provide new and improved systems and processes which preferably utilize enabling technologies to implement a retail process favorable to both a manufacturer and a retailer.

In accordance with the present invention, there is provided a system and process which enables a manufacturer to legally and effectively control the customer price of goods and services, while preserving the profitability of the retailer. Effectively, the current invention establishes systems and methods for enabling a manufacturer to establish a 'private' price between himself and the customer. This manufacturer-controlled price can be set legally and without upsetting either the normal pricing structure or profit margin of the retailer. Because the profitability of and hence good working relationship is maintained with the retailer, the retailer remains highly motivated to sell the manufacturer's products.

By effectively separating out the pricing of goods from the distribution, sale, and customer support for those goods, the present invention presents a new retail paradigm favorable to the manufacturer while motivating and using the best skills of the retailer. Further, the present invention provides such benefits and advantages using technologies available to all participants in the retail process.

The benefits of the invention flow not only to the channel, but also to the retailer and the customer. As will be appreciated, the retailer is enabled to move inventory much more effectively with the control of pricing established and supported by the manufacturer. This is accomplished while maintaining both local store pricing and profit margins. The customer is provided with competitive pricing established by the manufacturer, ease of use, and the instant gratification and high level of service that are provided by the retailer. The invention is preferably enabled by newly available electronic communications and networking technologies, which provide features particularly suited for the practice of the present invention.

Accordingly, the present invention provides a system and a process whereby a customer can examine merchandise information posted on a web site, receive a list of stores which have either the customer's desired product in stock or that typically stock the product, and pick up that product at a designated local store. The system and process allow a customer to log onto a central controller via the Internet and "lock-in" a price for a product. The locked in price represents a price established by a manufacturer and available at the identified stores regardless of their regular pricing. Such a locked in price is provided by a pre-established contractual relationship between the manufacturer and retailer, with an agreement preferably established for additional compensation from the manufacturer to the retailer as necessary to make the retailer whole.

The central controller or processor can be run by a manufacturer or any appropriate service provider and is configured to send the customer's credit card number, a product identifier, and a store identifier number to a credit card processor. When the customer goes to the designated local store for acquisition of the product, he alerts the attendant before making his purchase that he is entitled to a price established with the manufacturer/central controller via the Internet. The attendant then enters the customer's credit card number and the product identifier or number into a point-of-sale (POS) terminal that is coupled to a POS controller. The POS controller sends the credit card number and the product identifier to a credit card processor. The credit card processor retrieves the purchase price established or set by the central controller and sends that previously established price back to the POS controller for routing to the POS terminal. The attendant causes the previously established price to be charged to the customer, and the credit card processor transfers funds to the bank account of the store in a conventional way. At the end of a billing cycle, the manufacturer/central controller and the local store reach a settlement based upon a pre-negotiated contract.

The present invention achieves the aforementioned objects and provides the aforementioned benefits by providing a system for facilitating the sale and distribution of products that includes a data storage system maintaining information related to products including sellers of and prices for the products, and a data processing system operatively coupled to the data storage system. The data processing system is configured to receive a request from a buyer to acquire a product, to process the request by querying the data storage system to identify a purchase price and a seller to sell the product to the buyer at the purchase price, to send a notice to the buyer indicating the seller and the purchase price, to receive from the buyer a purchase request including an account identifier identifying an account to be updated based on the purchase price, and to send a purchase confirmation notice to the buyer indicating that the buyer can acquire the product from the seller at the purchase price.

Another aspect of the present invention includes the provision of a process for facilitating the sale and distribution of products that includes the steps of maintaining information related to products including sellers of and prices for the products, receiving a request from a buyer to acquire a product, processing the request by querying the information to identify a purchase price and a seller to sell the product to the buyer at the purchase price, sending a notice to the buyer indicating the seller and the purchase price, receiving from the buyer a purchase request including an account identifier, and sending a purchase confirmation notice to the buyer indicating that the buyer can acquire the product from the seller at the purchase price.

Additionally, another aspect of the present invention includes the provision of a system for facilitating the sale and distribution of a product that includes a data storage system maintaining a database related to products including sellers of the products and prices for the products, and a data processing system operatively coupled to the data storage system. The data processing system is configured to receive a request to acquire a product from a buyer located in a geographic area, to processes the request by querying the data storage system to identify a purchase price and a seller located in the geographic area to sell the product to the buyer at the purchase price, to send a notice to the buyer indicating the seller and the purchase price, to receive from the buyer a purchase request including an account identifier, and to send a purchase confirmation notice to the buyer indicating that the buyer can acquire the product from the seller at the purchase price.

Moreover, another aspect of the present invention includes the provision of an apparatus for processing a sale of a product adapted for use by a distributor of products and that includes a data processing system operated by a distributor that is configured to receive a product purchase request corresponding to a product and an account identifier from a buyer, to output the product purchase request and the account identifier to a credit card processor, and to receive a predetermined price from the credit card processor. The predetermined price being paid by the buyer to the seller allows the buyer to acquire the product from the seller.

Additionally, another aspect of the present invention includes the provision of an apparatus for processing a payment for a sale of a product adapted for use by a credit card processor that includes a data storage system operated by a credit card processor that is configured to maintain data about products including a buyer account identifier, a product identifier, and a predetermined price corresponding to a particular product. The apparatus also includes a data processing system operatively coupled to the data storage system. The data processing system is configured to receive a purchase request including an account identifier and a selected product identifier, to determine if the account identifier and the selected product identifier correspondingly identify the buyer account identifier and the product identifier to thereby specify the particular product, and if the particular product is specified, to output the predetermined price.

Furthermore, another aspect of the present invention includes the provision of an apparatus for facilitating the purchase of a product adapted for use by a buyer of products that includes a data processing system operated by a buyer and that is configured to transmit a product purchase request including a product identifier and an account identifier to a central processor and to receive from the central processor a purchase ability notice indicating a retailer identifier, the product identifier and a predetermined price identified by the central controller. The purchase ability notice indicates that the central processor determined that the product is available for purchase and acquisition from the retailer. The buyer is able to purchase and acquire the product from the retailer at a distribution center maintained by the retailer and at the predetermined price identified by the central controller.

Finally, an aspect of the present invention includes the provision of a system for identifying prices for products on line and for allowing acquisition of those products from outlets that honor the prices identified on line that includes a customer having a credit card account and a computer terminal configured to access a network a central authority coupled to the computer terminal via the network. The central authority maintains information about a product and a corresponding price. The price is established by the central authority and the central authority is configured to communicate the information about the product and the price to the customer via the network. Also included is a credit card processor coupled to the central authority. The credit card processor is configured to query the information maintained by the central authority and to receive the price from said central authority. The system also includes an outlet having a point-of-sale system coupled to the central authority and to the credit card processor. The outlet is arranged to deliver the product to the customer after the customer purchases the product from the outlet via his credit card account at the price identified by the central authority and which was provided to the outlet and the point-of-sale system by the credit card processor.

BRIEF DESCRIPTION OF THE DRAWINGS

The present invention is described in detail below with reference to the following drawing figures of which:

FIG. 5 is a database table storing inventory data maintained by the POS controller depicted in FIG. 3;

FIG. 6A illustrates a database table for storing merchandise data maintained by the central processor depicted in FIG. 2;

FIG. 6B illustrates a database table for storing POS data maintained by the central processor depicted in FIG. 2;

FIG. 6C illustrates a database table for storing customer data maintained by the central processor depicted in FIG. 2;

FIG. 6D illustrates a database table for storing transaction data maintained by central processor depicted in FIG. 2;

FIG. 7 illustrates a database table for storing reservation data maintained by the credit card processor depicted in FIG. 4;

DETAILED DESCRIPTION OF THE PREFERRED EMBODIMENTS

Figure 1:
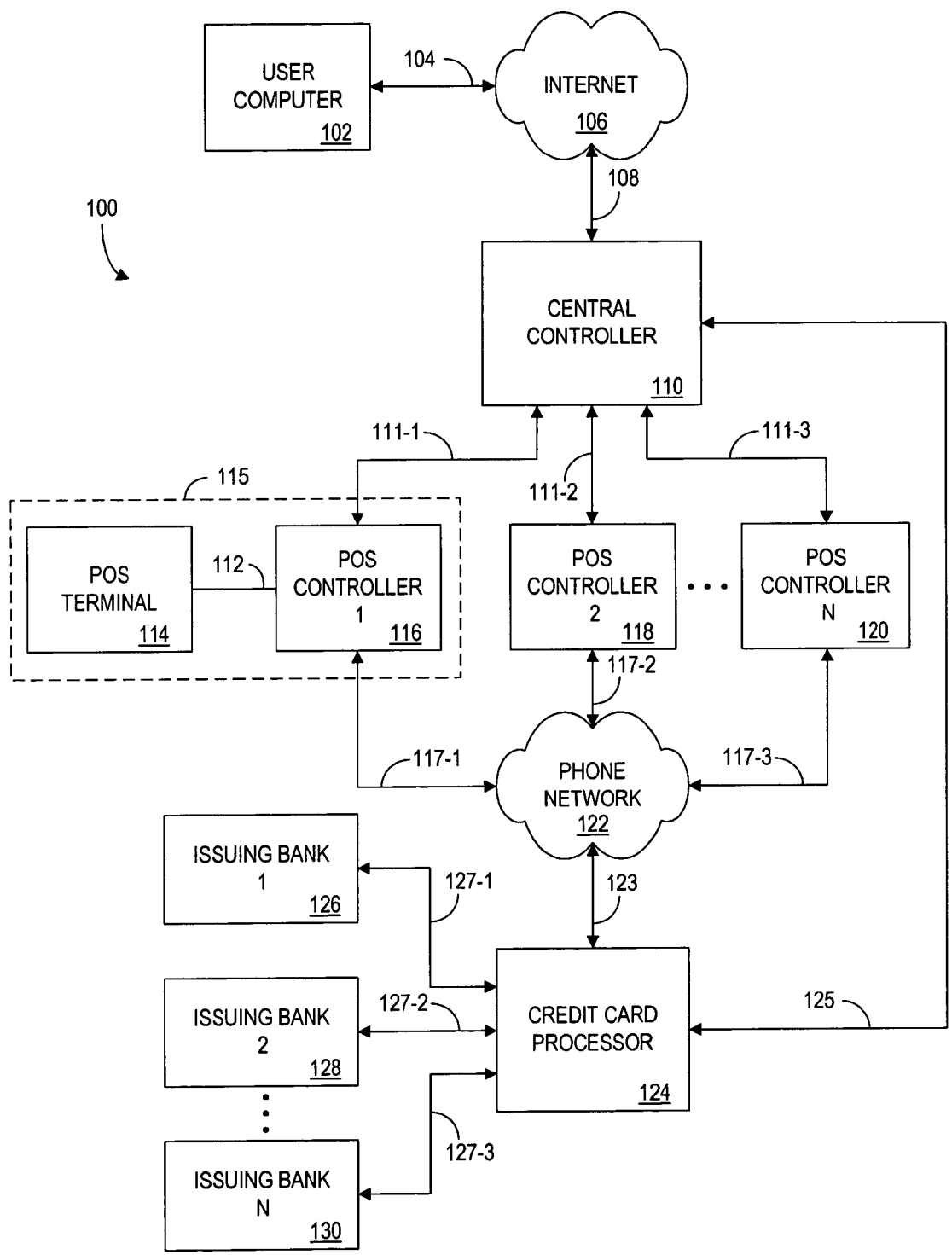
FIG. 1 is a block system diagram according to a preferred embodiment of the present invention.

In this section, the present invention is described in detail with regard to the drawing figures briefly described above.

Accordingly, the following terms are used throughout the remainder of this section. For purposes of construction, such terms shall have the following meanings:

The terms "outlet", "retailer", "merchant", and "store", unless otherwise specified below, are used interchangeably to refer to any type of retail merchandising establishment that sells goods to, and processes point-of-sale transactions from, customers. The terms include both walk-in and remote (e.g. catalog) sellers who, in accordance with the invention, have agreed to honor a price that is established between a customer and a manufacturer.

The terms "product", "good", "item", and "service", unless otherwise specified below, are used interchangeably to refer to any type of commodity that may be sold or otherwise distributed by a retailer. It should be readily appreciated that both products and services may be sold by retailers. An example of a product is a video cassette recorder. A service may include dry-cleaning services.

The term "user", unless otherwise specified below, refers to a customer who uses a computer or other personal data processing system to access a world wide web ("web" or "WWW") or network site to search through electronic product catalogs, receives manufacturer established prices for selected products, and picks up and possibly purchase such products from local retailers.

The above defined terms are used below to describe the preferred embodiments of the present invention in reference to the attached drawing figures. Where appropriate, like parts are referred to with like reference numerals.

Referring now to FIG. 1, therein depicted is a block diagram of a system 100 for allowing product purchases to be initiated online (e.g., via a distributed data network connection such as via the Internet and World Wide Web) and products to be purchased and picked up at a local retailer. In particular, system 100 includes a user computer 102 operating a web browser or other appropriate network connection such as Netscape Navigator V.3.0 or Internet Explorer for Windows 95. Additionally, system 100 involves a network 106 (preferably the Internet or any appropriate collection of interconnected computers), a central controller 110 controlling a data processing system (not shown), at least one POS controller 116, 118, and 120 each disposed in corresponding retailers, a telephone network 122, a credit card or financial instrument processor 124 and at least one banking institution 126, 128, and 130.

Shown in phantom lines is logical part 115. Logical part 115 represents a store including POS controller 116 and at least one POS terminal 114 which are coupled together via data link 112. Data link 112 will be readily understood by those skilled in the art as a network connection or other appropriate data coupling.

In addition to the preferred configuration of a user and a personal computer, user 102 may also operate a WEB-TV device, a telephone, a facsimile or fax machine, a personal digital assistant, a screen-phone or any appropriate device to communicate with central controller 110.

The component parts forming system 100 will be readily understood by those skilled in the art of credit card processing and computer data processing systems. Accordingly, for purposes of brevity, detailed discussions of such component parts are omitted.

In terms of the couplings and connections found in system 100, FIG. 1 illustrates many of the interconnections that allow for the functionality and interoperability of the component parts forming system 100. In particular, user computer 102 is coupled to network 106 via a link 104 which is a line such as a telephone line, an ISDN line, or a modem line or may be any other network connection or line (e.g., T1 or T3) that will allow data communications between a network and a host terminal. User computer 102 may further comprise either a dedicated end-user computer, a network node such as one employing TCP/IP protocols and having a network IP address, or possibly a network of users such as a corporate buying community coupled together in some form of intranet or mid-net arrangement. Link 108 with central controller 110 performs a similar function to link 104, and may also be a dedicated telephone line such as a T1 or T3 broad band communications line.

Links 104 and 108 allow for the communication of purchase related information such as customer numbers, product identifiers, account numbers, account identifiers, or any other information communicated between terminal ends of links 104 and 108 (i.e., user computer 102, Internet 106, and central controller 110). The communication of such information will be detailed throughout the remainder of this section. It is important to note, however, that links 104 and 108 may be used to transport information and messages from the central controller 110 to user computer 102 regarding transactions and the like as described below. In this way, system 100 now enables an electronic buying club or other such entity that could be global in nature.

Links 111-1, -2, and -3 allow bi-directional data communications of product identifiers and other information between central controller 110 and POS controllers 116, 118, and 120. Like links 104 and 108, links 111-1, -2, and -3 may be of any variety that allow data communications. In most instances, such links will be dedicated or leased telephony lines.

Links 117-1, -2, and -3 preferably are telephony links or any appropriate data link enabling POS controllers 116, 118, and 120, respectively, to communicate via telephone network 122 with credit card processor 124. The establishment of telephonic links will be readily apparent to those skilled in the art.

Link 125 also is a data communications line and is configured to allow for data communications to occur between central controller 110 and credit card processor 124. Such communications involve, among other things, the bidirectional transmission of purchase-related information such as product identifier, credit card number, purchase price and any other information that may be used to establish prices on line to facilitate the purchase of goods and subsequent acquisition of such goods from a local merchant.

Credit card processor 124 also communicates with at least one issuing bank 126, 128, and 130 via appropriate data links 127-1, -2, and -3 which will be readily apparent to those skilled in the art of credit card processing systems.

As will be seen, the structural elements and arrangement of system 100 enable a new product sale and distribution paradigm. In particular, system 100 allows a customer through a user computer 102 to browse through merchandise information posted on a network or web site or on some other commercial on line service such as AMERICA ON LINE or COMPUSERVE. The merchandise information could be displayed as an electronic catalog which is hosted by central controller 110. Central controller 110, for example, is equipped (FIG. 2) and configured to provide user 102 with a list of retailers which either have the customer's desired product(s) or that typically stock such product(s).

The formation of a list of candidate retailers by central controller 110 is achieved by a data processing system (FIG. 2) that is configured to allow searching and criteria setting via a network interface. Such a system for allowing searching and criteria setting via the world wide web and the Internet is the VERITY SEARCH ENGINE designed and implemented by VERITY SOFTWARE, INC. Such a search engine allows user computer 102 to specify a geographic location, product choices, product feature sets, price ranges, etc. The search engine scans appropriate database tables such as those depicted in FIGS. 6A–6D to produce and provide lists of retailers in a particular geographic location (e.g., the specified location of user computer 102) normally stocking products having particular traits selected by the user and which are sold at identified prices as set and established by a manufacturer and stored in and displayed by central controller 110. The implementation of such web-enabled search and database systems will be readily apparent to those skilled in the art of database management systems.

In system 100, when user computer 102 identifies a product online via an interactive web-browser, user computer 102 is then provided a price established by a manufacturer and transmitted from central controller 110. Thereafter, a user/customer can purchase and pick up the selected product from a retailer, selected from the list of retailers who have agreed to honor the price set by the manufacturer and transmitted to user computer 102, regardless of the retailer's normal price for such product. Accordingly, system 100 allows user computer 102 to log onto a central controller via network 106 and "lock-in" a price for an item which may be different from the shelf price posted at the local store from which the customer chooses to subsequently purchase that item.

Of course, it should be appreciated that system 100 and the present invention may be configured to allow purchases, in addition to prices establishment, to occur via on line means such as by way of an electronic commerce package (e.g., NETSCAPE COMMUNICATIONS' COMMERCE SERVER software package). In such an embodiment, user 102 transmits payment data to central controller 110, or directly to the merchant. Payment may take the form of a credit card purchase or other electronic payment such as a wire transfer or other form of digital or electronic cash.

In addition to the notion of selecting goods and products and establishing prices for the same online, system 100 allows for local store inventory checking and inventory reservations so that a customer knows and is assured that he may acquire a particular product for which he received a price online. Accordingly, after a consumer negotiates a price for a selected product, the consumer is assured that he will actually receive the product when he goes to a selected retailer to acquire that product. As such, system 100 can allow a hold or reservation to be made to reserve an inventory item at a local store.

Such reservations of goods can occur by having central controller 110 send a message to the selected local store that causes the local store to place a hold on the inventory item. Such a message is preferably sent electronically in the form of a database instruction and, in particular, an automatic computer-to-computer communication that causes the local store's database management and computer data processing system to create a reservation hold record in an appropriate database to reference a reserved product. For example, electronic data interchange (EDI) messages may be used to communicate inventory holds and reservations. Additionally, an automated voice messaging system could be configured to be operated by central controller 110 to cause a voice-based message to be sent to an attendant, possibly an automated attendant, for appropriate routing and inventory holding. As such, by causing a reservation to be made via some form of communication between central controller 110 and a local store, a user can be assured that his product will be set aside for his purchase and pickup.

The actual process of reserving an inventory item can occur by setting a flag in an appropriate database management system that corresponds to a particular inventory item that is maintained by a local store's data processing system. The setting of flags and the recordation of data items and controls necessary to indicate a state relative to a particular field in a database management system will be readily understood by those skilled in the art of computer programming and, in particular, database management systems.

Figure 2:
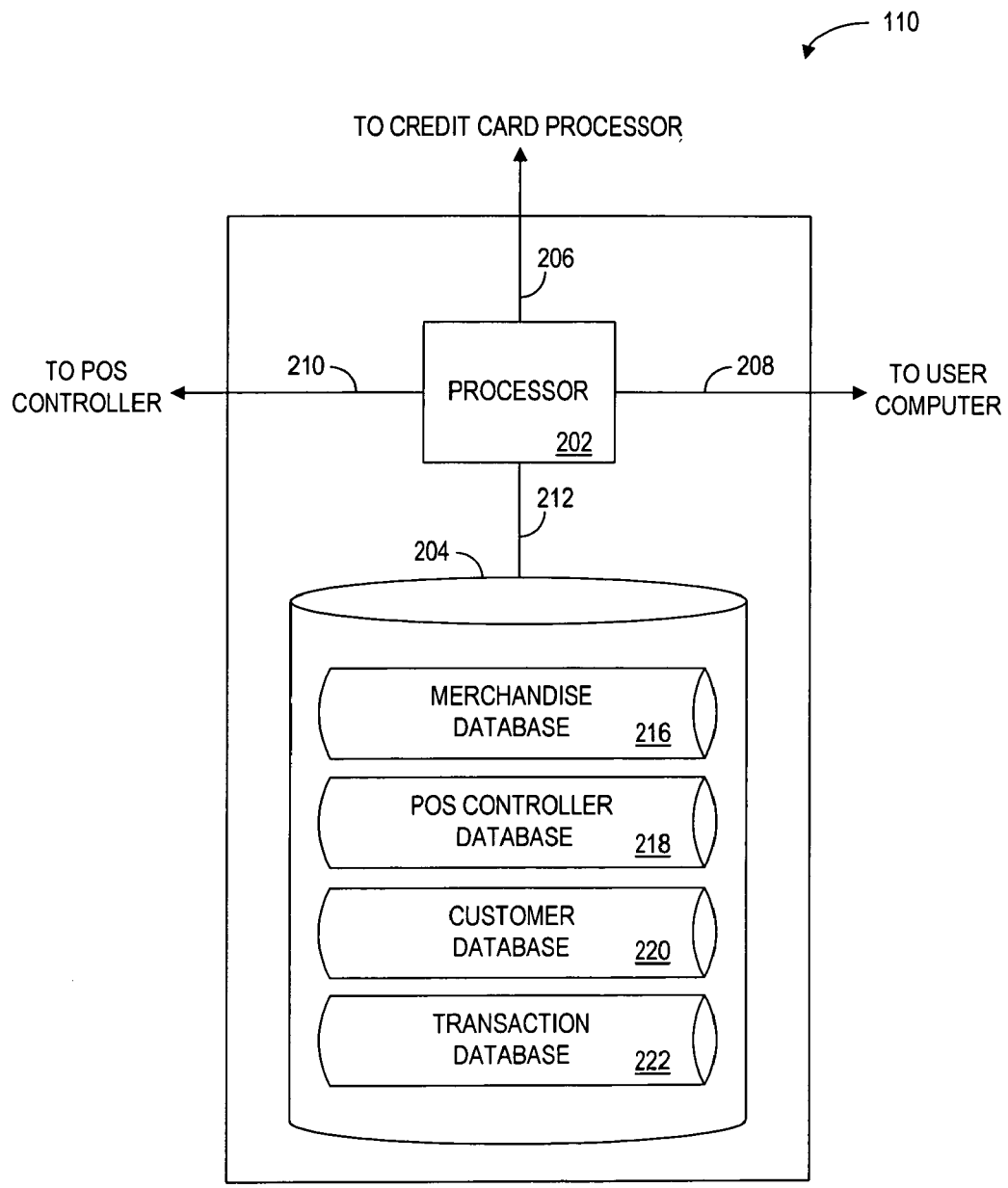
FIG. 2 is a block diagram of the central processor depicted in FIG. 1.
Figure 4:
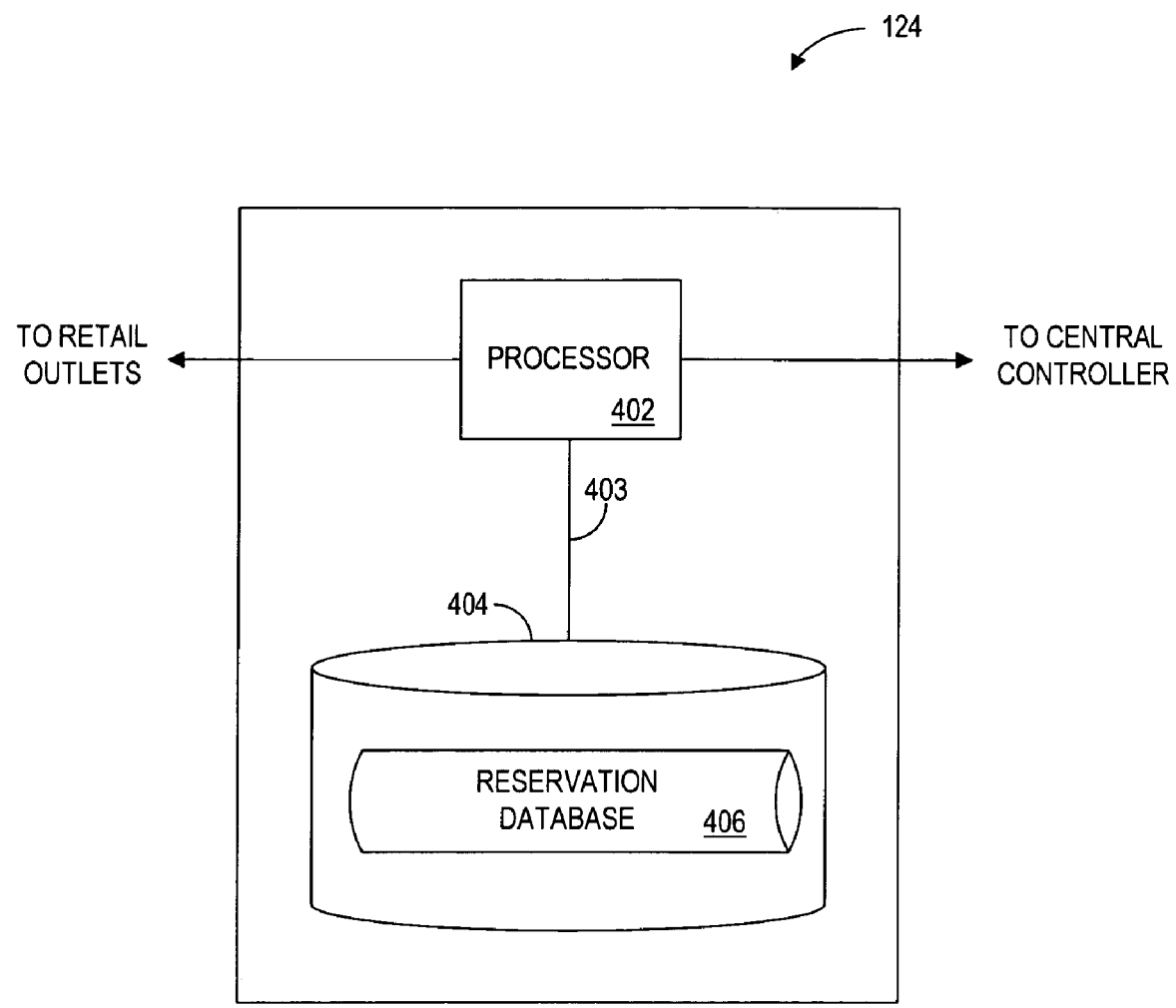
FIG. 4 is a block diagram of the credit card processor depicted in FIG. 1.

The aforementioned functionality is achieved, in large part, by central controller 110 and its data processing systems (FIG. 2). Central controller 110 preferably is operated by any appropriate party capable of receiving data from one or more manufactures and operating and maintaining the controller as described below. In any case, central controller 110 is configured to send a customer's credit card number, a product number or identifier, and a store or merchant ID to credit card processor 124 who also maintains a data processing system that carries out certain functionality of system 100 (FIG. 4).

In system 100, after user computer 102 receives a purchase price from central controller 110, the customer may then go to a store of his choice for pick up or acquisition of his selected product. At the store (designated by logical part 115 in phantom lines), user 102 alerts a cashier or point-of-sale attendant that he has established a price for a selected product with central controller 110 via network or Internet 106. Thereafter the cashier enters user 102's credit card number and an appropriate product identifier (e.g., a part number, SKU, UPC or other bar-code identifier) into a point-of-sale (POS) terminal (e.g., POS terminal 114) such as one manufactured by VERIFONE (e.g., the VERIFONE TRANZ Model No. 380) and that is coupled to a POS controller (e.g., POS controller 116).

The operative POS controller (e.g., POS controller 116 for sake of discussion) is configured to thereafter send user 102's credit card number and the product number or identifier via link 117-1 and telephone network 122 to credit card processor 124 for processing. In system 100, credit card processor 124 can retrieve the purchase price from its data store which was earlier provided with corresponding pricing data by central controller 110.

Thereafter, in system 100, the aforementioned cashier causes the price retrieved from credit card processor 124 and displayed by point of sale terminal 114 to be charged to user 102 and the credit card processor transfers funds to the bank account of the store (in this case logical part or logical store 115). At the end of the billing cycle, the manufacturer who established the price and the local store reach a settlement based upon a previously established contract between the parties.

The aforementioned discussions about the structure and operations of system 100, make clear that a customer with a user computer 102 can now access a network containing product information to receive a manufacturer set price for an item on line from a central authority to facilitate a purchase of that item. Thereafter, the customer can purchase and pick up that item from a merchant or other local retail outlet that will honor the manufacturer set price. In this way, system 100, in effect, removes the element of price establishment from the typical product sale process or merchandising paradigm and places it with the manufacturer.

By removing the price establishment element from the typical merchandising paradigm and placing the same in the hands of a manufacturer, buyers will be able to take advantage of better pricing while allowing manufacturers and other central authorities to realize greater volumes of sales via electronic commerce and the like. Moreover, by allowing manufacturers and other central authorities to set and display prices for goods online while having local merchants support and service purchased goods, buyers both receive favorable pricing and excellent service. Such direct marketing on line will allow manufacturers and other central authorities to run sales campaigns that are managed directly by such manufacturers, while continuing to use partner retailers for servicing of goods. Further, since the retailers will subsequently be reimbursed or otherwise made whole under contract with the manufacturer, they are motivated to provide quality sales and service support to the customer.

In addition to the foregoing comments, it should be noted that the present invention is primarily concerned with establishing prices for goods and products on line and allowing customers to acquire and purchase such goods and products from local retailers of their choice. The present invention further contemplates the establishment of prices for services and the like.

Referring now to FIG. 2, central controller 110 includes a processor 202 and a data storage system 204. Processor 202 is conventional and for example may comprise one like those manufactured by SUN (e.g., the Sun Sparc 1000 running the Solaris Operating System). Processor 202 is a computer system adapted to run software programs and that is configured with communications equipment such as telephony communications and network communications equipment to communicate with credit card processor 124 via communications link 206, user 102 via communications link 208, and at least one POS controller 116, 118, and 120 via communications link 210. Data storage system 204 is preferably any form of mass storage device configured to read and write data in a file store (e.g., magnetic and/or optical disk data storage devices). Of course, it will be readily appreciated that data storage system 204 may be one that consists of multiple disk sub-systems which may be geographically dispersed and coupled via a network architecture. There is no requirement that data storage system 204 be maintained in one facility; to the contrary, the volume of information stored therein may dictate geographical dispersion and the like. All that is required is that data storage system 204 be logically addressable across a networked system. The implementation of local and wide-area database management systems to achieve the functionality of data storage system 204 will be readily understood by those skilled in the art of computer technologies.

Processor 202 and data storage system 204 are coupled together in a conventional way via a link 212. Communications link 212 is a high-speed data transfer medium which may include a bus or network architecture as indicated above. As such, communications link 212 will be readily understood by those skilled in the art of computer architecture.

Stored within data storage system 204 are database tables forming a database management system maintained by central controller 110. In particular, data storage system 204 stores a merchandise database 216, a POS controller database 218, a customer database 220, and a transaction database 222 which are managed by a relational database management system software package such as the Oracle System 7 database management system. The creation of such databases and the management and manipulation of such tables will be readily apparent to those skilled in the art of database management systems and, especially, relational database management systems. The database tables stored within data storage system 204 are addressed in detail below with regard to FIGS. 6A–6D.

Figure 3:
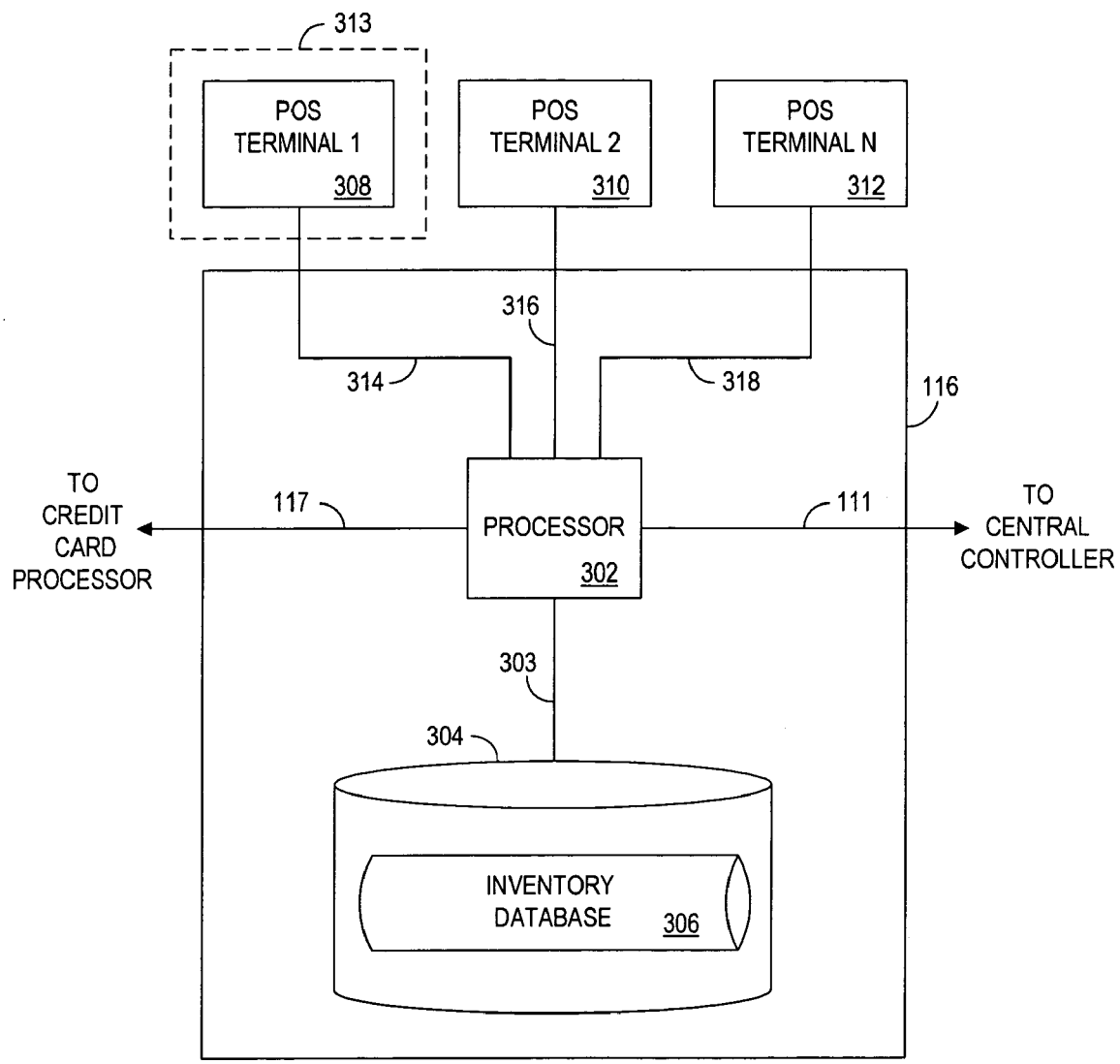
FIG. 3 is a block diagram of a POS controller like the POS systems depicted in FIG. 1.

Referring now to FIG. 3, therein depicted is a block diagram of POS controller 116. In particular, POS controller 116 includes a processor 302 and a data storage system 304. Processor 302 is preferably like processor 202 (FIG. 2) and, accordingly, a detailed discussion of the computer system forming processor 202 is omitted for purposes of brevity. The construction and operation of processor 302 will be readily appreciated by those skilled in the art.

In addition to processor 302, POS controller 116 includes a data storage system 304 like data storage system 204. Accordingly, a detailed discussion of data storage system 304 is omitted for purposes of brevity. Data storage system 304 is shown to maintain a database table identified as an inventory database 306 which is discussed in detail below in regard to FIG. 5.

As in FIG. 2, processor 302 and data storage system 304 are coupled via a link 303 such as a bus or network architecture. Link 303 will be apparent to those skilled in the art of computer design and a detailed discussion of the same is therefore omitted.

Processor 302 is configured with a conventional communications section (not shown) to communicate with three POS terminals 308, 310, and 312 via links 314, 316, and 318, respectively, as was originally illustrated in regard to the structures shown in FIG. 1. A box 313 shown in phantom lines includes POS terminal 308 and is intended to identify a merchant or retailer that maintains POS terminal 308. The nature of communications links 314, 316, and 318 will be readily apparent to those skilled in the art.

In addition to communicating with POS terminals 308, 310, and 312, processor 302 is configured to communicate with a central controller and a credit card processor via communications links 111, 117, respectively, as was illustrated in FIG. 1.

Referring now to FIG. 4, therein depicted is a data processing system of a credit card processor of the type originally illustrated in FIG. 1. In particular, credit card processor 124 includes a data processing system having a processor 402 and a data storage system 404. Processor 402 is preferably like processors 202 (FIG. 2) and 302 (FIG. 3) and, accordingly, a detailed discussion of the computer system forming processor 402 is omitted for purposes of brevity. The construction and operation of processor 402 will be readily appreciated by those skilled in the art.

In addition to processor 402, credit card processor 124 includes a data storage system 404 like data storage system 204 (FIG. 2) and 304 (FIG. 3). Accordingly, a detailed discussion of the construction and operation of data storage system 404 is omitted for purposes of brevity. Data storage system 404, however, is shown to maintain a database table identified as a reservation database 406 which is discussed in detail below in regard to FIG. 7.

As in FIGS. 2 and 3, processor 402 and data storage system 404 are coupled together via a communications link 403 such as a high-speed bus or network architecture. The nature of link 403 will be apparent to those skilled in the art of computer design and a detailed discussion of the same is therefore omitted.

Processor 402 is configured with a conventional communications section (not shown) to communicate with a central controller and at least one retail outlet via a point-of-sale controller such as the one depicted in FIG. 3 that was originally illustrated in FIG. 1.

The aforementioned and described systems shown in FIGS. 2–4 are illustrative of preferred embodiments of systems that may be used to carry out the functions of the system depicted in FIG. 1. Moreover, the data stored in the tables maintained by the systems depicted in FIGS. 2–4 may change and vary to suit particular implementation details and requirements. Such changes will be readily appreciated by those skilled in the art of computer system design and implementation.

The following paragraphs describe the database tables that are used in the present invention to allow users through a user computer 102 (FIG. 1) to receive prices for selected products on line and to pick up such products from local outlets. The database tables depicted in FIGS. 5, 6A, 6B, 6C, 6D, and 7 are preferred embodiments and are intended to be operational in a computerized data processing system adapted to manage table relationships established by common fields and proper table joins and related queries. In particular, a relational database management system is well-suited to manage the flow of information within a system such as system 100 (FIG. 1) and the processing of data and the tables illustrated in FIGS. 5, 6A, 6B, 6C, 6D, and 7. Preferably, the database management system that is used to manage the database tables illustrated in FIGS. 5, 6A, 6B, 6C, 6D, and 7 is ORACLE 7 produced by ORACLE CORPORATION or a product of similar function. Of course, many changes and alterations may be made to such tables to effect certain functionality depending on particular design and implementation details. Such changes and alterations will be apparent to those skilled in the art of computer programming and database management system design and implementation. Moreover, the use of a database management system such as ORACLE 7 will be readily apparent to those skilled in the art of database design and implementation.

In addition to the foregoing comments, certain records in the database tables that are discussed below have asterisks next to certain record identifiers. The asterisks are intended to identify the records among the tables that are related by way of a subsequently described transaction, and are meant to illustrate the benefits associated with the present invention. The records marked with asterisks will also be referenced in the flowcharts of FIGS. 8A–8D to clarify the operations carried out by the various components of system 100 (FIG. 1).

Referring now to FIG. 5, therein depicted is a database table for storing records related to inventory items on hand at a given retailer that maintains a POS controller system such as POS controller 116 (FIG. 3). INVENTORY DATABASE table 306 (hereinafter "table 306") has a column and row arrangement whereby columns define fields and rows define data records stored according to the field specification of the columns. In table 306 there are two columns—one for storing ITEM or PRODUCT NUMBERS and another for storing QUANTITY AVAILABLE. Table 306 illustrates three records.

Record R1 contains information related to an item or product having an ITEM NUMBER of 4956323. Record R1 has been marked with an asterisk next to its record identifier to indicate that it is related to other records in other tables that will be discussed in detail in the following paragraphs. The store to which table 306 pertains (i.e., the store or retailer that maintains a POS controller that manages table 306), currently has 45 pieces on hand in inventory as indicated by the QUANTITY AVAILABLE. Accordingly, the store or retailer to which table 306 (and a corresponding POS controller) pertain, can allow for a guaranteed local pick up of item or product number 4956323 if a user or customer uses a system like system 100 (FIG. 1) to lock-in a price and a guarantee for local pick up.

Records R2 and R3 have the same record format as record R1 and indicate similar information related to other products available for sale by the store or retailer that maintains the POS controller that manages table 306. Accordingly, for purposes of brevity, a detailed review of records R2 and R3 is omitted.

The relationship of table 306 to other data processing systems and databases utilized in system 100 (FIG. 1) will be clear from the discussions of the same that follow in regard to FIGS. 6A–6D, and 7 and the subsequent discussions in this section regarding FIGS. 8A–8D. It is important to note, however, that the structure and arrangement of table 306, including its columns and fields, may change to suit particular design requirements. Many columns may be added to table 306 to carry our certain functionality and control within a data processing system employing a database table like table 306. Such additions and changes will be apparent to those skilled in the art.

Referring now to FIG. 6A therein depicted is MERCHANDISE DATABASE table 216 (hereinafter "table 216") which is maintained by a central controller 110 in system 100 in a data storage system 204 as illustrated in FIG. 2. Table 216 has a column and row arrangement wherein columns form the fields and rows form the records. In particular, table 216 stores information about ITEM NUMBERs, ITEM DESCRIPTIONs, MANUFACTURERs, MODEL NUMBERs, PRICEs set by the manufacturer, STORE ID NUMBERs, and QUANTITY AVAILABLE relative to particular products.

In table 216, record R1 has been marked with an asterisk next to its record identifier to indicate that it is related to other records in other tables and will be discussed in detail in the following paragraphs. Record R1 stores information related to an ITEM NUMBER 4956323 for a FOUR HEAD VCR manufactured by SONY having a model number of TS-131 and which is to be sold by a store having an identification number of 32449 which has 45 such VCRs on hand in its inventory. Store number 32449 will honor the price of $349.99 as set and established by the manufacturer regardless of whether the store usually or regularly sells such a VCR at that price or not. Accordingly, as will be discussed in detail below, table 216 allows system 100 to establish a price with a buyer for the VCR and allows the buyer to go to a local store (in this case store number 32449) for purchase and pick up of that VCR.

Records R2 and R3 illustrate other products that may be offered to buyers on line and for which prices have been established and will be honored by local merchants. Accordingly, for purposes of brevity, a detailed review of records R2 and R3 is omitted. It is important to note, however, that table 216 stores information about products offered by different stores, thereby illustrating a key aspect of the present invention. That is, the operator of the central controller that maintains table 216 need not necessarily be a member of the organization that owns a particular store such as store number 32449 (CALDORS as indicated and discussed below in regard to FIG. 6B). Rather, at a minimum, all that is required is a contractual relationship between the manufacturer who sets the prices and the retailers who sell the goods. Such a contract should typically involve the requirement that the price (e.g., $349.99 for the Four Head VCR sold by store number 32449 as indicated in record R1) that is displayed through the central controller is to be honored by a contractually obligated store or outlet.

Moreover, the prices shown in table 216 are prices that, when accepted by a buyer via an on line request, are considered as the set prices. When a buyer visits a local retailer for acquisition of a product selected on line, the set price will be the purchase price and will be honored by the merchant. The merchant may charge sales or other taxes during the course of a transaction, but such taxes do not affect the sales price established by the central controller.

In table 216, the prices displayed are in U.S. dollars. The present invention, however, is not so limited. In fact any form of currency may be used and a system such as system 100 employing any of the database tables described herein may be configured to allow conversions from one form of currency to another. Such conversions may be necessary when a buyer wishes to pick up or acquire goods from an outlet overseas after negotiating the price for such goods from the comfort of his home or office.

Referring now to FIG. 6B, therein depicted is POS CONTROLLER DATABASE table 218 (hereinafter "table 218") which is maintained by a central controller 110 (FIG. 1 and FIG. 2). Table 218 has a column and row arrangement wherein columns form the fields and rows form the records. In particular, table 218 stores information related to POS CONTROLLER IDs, STORE NAMES, ADDRESSes, and STORE ID NUMBERs. In this case, the store identification numbers are the same as the POS controller identification numbers, but the invention is not so limited.

In table 218, record R3 has been marked with an asterisk next to its record identifier to indicate that it is related to other records in other tables and will be discussed in detail in the following paragraphs. Record R3 stores information related to a POS CONTROLLER that is maintained by CALDORS, a retailer at 1297 Hard Road in Phoenix, Ariz., and which has a store identification number of 32449.

The other records in table 218 contain information similar to record R3. Accordingly, detailed discussions of records R1, R2, and R4 are omitted for purposes of brevity. It is important to note, however, that table 218 is related to table 216 via a common column or field such as STORE ID NUMBER and that table 218 allows a central controller to display store names to a buyer on line by performing a database query on table 218 or a join to relate tables 216 and 218 so as to relate store names to store identification numbers.

Referring now to FIG. 6C, therein depicted is CUSTOMER DATABASE table 220 (hereinafter "table 220") which is maintained by central controller 110 in system 100 (FIG. 1 and FIG. 2). Table 220 has a column and row arrangement wherein columns form the fields and rows form the records. In particular, table 220 stores information about customers of a central controller who have registered to use the services provided by the central controller. In particular, table 220 stores information relating to CUSTOMER NAMEs, REGISTERED USER ID NUMBERs, CREDIT CARD NUMBERs, EXPIRATION DATEs, TELEPHONE NUMBERs, E-MAIL ADDRESSES, and ADDRESSES.

In table 220, record R3 has been marked with an asterisk next to its record identifier to indicate that it is related to other records in other tables and will be discussed in detail in the following paragraphs. Record R3 stores information related to a customer named Betty Cardow who has a customer identification number of 123546215, a credit card number of 3333-3333-3333-3333, a credit card expiration date of February 1998, a telephone number of (343) 899-0099, an e-mail address of caRd@web.tv.net and a street address of 1191 Anvil Drive in Norwalk, Conn. In this case, Ms. Cardow is a WEB-TV user who apparently uses her television set configured with world wide web navigating technology to allow her to visit a web site maintained by the central controller to receive manufacturer-set prices for goods that she can acquire at stores near her home in Norwalk, Conn.

Records R1 and R2 illustrate other customers and registered user of the central controller that maintains and manages table 220. Accordingly, for purposes of brevity, a detailed review of records R1 and R2 is omitted.

Referring now to FIG. 6D, therein depicted is a COMPLETED TRANSACTION DATABASE table 222 (hereinafter "table 222") which is maintained by central controller 110 in system 100 (FIG. 1 and FIG. 2). Table 222 has a column and row arrangement wherein columns form the fields and rows form the records. In particular, table 222 stores information used by a central controller to record transactions in which it has established the manufactuer-set prices and for which customers may have acquired corresponding goods from local stores in relation thereto. Table 222, as will be discussed below in regard to FIGS. 8A–8D, is used by a central controller to settle transactions with local stores based on pre-negotiated contracts between such local stores and manufacturers. In the case of a transaction where a buyer actually acquires a product from a local store after the buyer has received a set price for the same from the central processor, the local store may have an arrangement (i.e., by way of a pre-negotiated contract like those discussed above in regard to table 218) whereby the manufacturer may pay a portion of the difference between the set price and the local store's normal shelf price to the local store. Such arrangements are mentioned to illustrate the nature and purpose of table 222.

In table 222, record R3 has been marked with an asterisk next to its record identifier to indicate that it is related to other records in other tables and will be discussed in detail in the following paragraphs. Record R3 stores information related to a transaction involving an item having number 4956323, and a credit card number 3333-3333-3333-3333 and that occurred at a store having a POS controller ID number 32449 on May 26, 1997. As noted in record R3, the transaction or the established price is set to expire or otherwise cease to be valid on May 29, 1997; after May 29, 1997, the customer having credit card number 3333-3333-3333-3333 will not necessarily be guaranteed to receive item number 4956323 at the manufacturer-set price of $329.99 as indicated in table 406 (discussed below). As should be readily apparent, record R3 is related to records in other tables. For example, record R3 relates to Ms. Cardow (from table 220) who visited a SHARPER IMAGE store in Stamford, Conn.

Records R1 and R2 illustrate other transactions stored by a central controller in table 222. Accordingly, for purposes of brevity, a detailed review of records R1 and R2 is omitted.

Referring now to FIG. 7, therein depicted is RESERVATION DATABASE table 406 (hereinafter "table 406") which is maintained by credit card processor 124 in system 100 (FIG. 1 and FIG. 4). Table 406 has a column and row arrangement wherein columns form the fields and rows form the records. Table 406 is shown to store data relating to three reservations. For each reservation, a CREDIT CARD NUMBER, a POS CONTROLLER ID, an ITEM NUMBER, a PRICE from the central controller, a TRANSACTION DATE, an EXPIRATION DATE, and a STORE ID NUMBER are stored. Each record in table 406 stores a reservation that can be used by a POS controller and a POS terminal to determine a price for a given product that was set online and which a local merchant will honor. A reservation allows system 100 to enable a buyer to "lock-in" a price for a product and pick up or acquire that product from a local merchant who will honor the price previously negotiated. Table 406 can also be used to drive systems within a store to place holds on inventory items.

For purposes of discussion, record R3 has been marked with an asterisk next to its record identifier to indicate that it is related to other records in other tables and will be discussed in detail in the following paragraphs. Record R3 stores information about a reservation which was created by a central controller 110 (FIG. 1). Moreover, record R3 stores information related to a transaction involving a credit card having a credit card identifier of 3333-3333-3333-3333 and which occurred at a store having an identification number or code of 32449. Additionally, the reservation was processed by a POS controller having an identification number of 32449 and involves the sale and local pick up of a product having an item number of 4956323 which is to be sold for $329.99. The date of the transaction was May 26, 1997 and the price was good until the expiration date of May 29, 1997.

Accordingly, table 406 illustrates how, after a buyer received the sale price of $329.99 from central controller 110, a reservation was recorded by a credit card processor (as indicated by the user's credit card number stored in table 220) in table 406. That reservation will enable the buyer to visit store number 32449 (in this case CALDORS as identified by table 218) to pick up her four head VCR (as indicated by table 216) by May 29, 1997 at the price of $329.99 which may be significantly lower than the price store number 32449 normally charges (i.e., shelf price).

Records R1 and R2 illustrate other reservations stored by a credit card processor in table 406. Accordingly, for purposes of brevity, a detailed review of records R1 and R2 is omitted.

The systems shown in FIGS. 1–4 including the database tables illustrated in FIGS. 5, 6A, 6B, 6C, 6D, and 7 have been designed to operate together. The flowcharts illustrated in FIGS. 8A–8D and described below outline the steps carried out by a system such as system 100 in manipulating the aforementioned database tables to allow customers to receive established prices for goods on line and to acquire or obtain such goods from local retailers that will honor such prices.

Figure 8A:
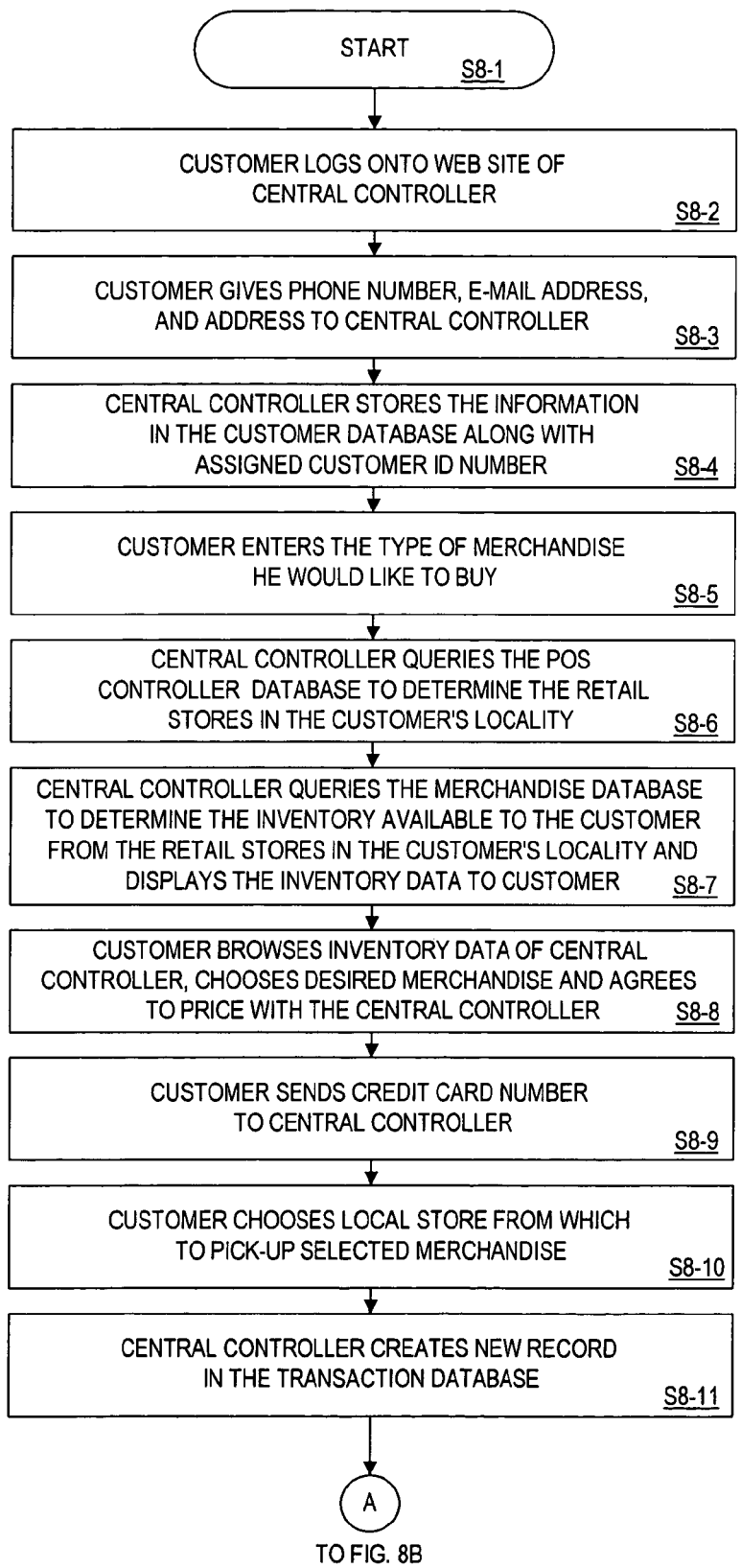
FIG. 8A is a flowchart that illustrates the process carried out by the system depicted in FIG. 1.

Referring now to FIG. 8A, depicted therein is a flowchart that illustrates the salient steps of a preferred process for allowing a system such as system 100 to enable buyers to receive manufacturer set prices for goods and products online and to acquire such goods and products from local stores that will honor such prices. Many of the steps depicted in FIG. 8A illustrate the sequence of operations carried out by a data processing system maintained by a central controller such as central controller 110 (FIG. 1). The computer programming necessary to carry out the functions stated below will be readily apparent to those skilled in the art of computer programming. Additionally, the use of web-enabled technologies to allow data entry on web site screens and the querying and searching of web-enabled database systems (including the systems described herein) will be readily apparent to those skilled in the art. For example, it is quite common for users of the Web to visit a web site that allows HTML (hyper-text markup language) data entry screens to be filled-in on line and to drive search engine systems such as the VERITY SEARCH ENGINE by Verity Software to provide users with lists of matching data. One such on line search and retrieval system is maintained by the U.S. Patent and Trademark office at http://www.uspto.gov and is used to specify search criteria which is processed to derive lists of matching U.S. patent abstracts. Such data search and retrieval systems will be immediately understood by web developers and the like.

Processing starts at Step S8-1 and immediately proceeds to Step S8-2 where a customer or user logs into a web site maintained by a central controller via web enabled browser such as one manufactured by Netscape (e.g. the Netscape Navigator). Of course, the term "logging in" in this context is used loosely as the world wide web on the Internet is a stateless and anonymous environment. Those skilled in the art of web enabled computer systems will appreciate how to provide a "log in" setting and the like.

After accessing the central controller, the customer is queried to enter his telephone number, e-mail address, and street address to the central controller at Step S8-3.

It should be understood that although the web and the Internet are the preferred modes by which the customer logs into or accesses the central controller, the present invention contemplates and covers other communications approaches. For example, the present invention can accommodate the case where the customer uses his telephone to dial into a central controller to speak with an operator. Alternatively, a voice response unit could prompt the user for input of information such as catalog information. Additionally, the present invention can accommodate the case where the customer uses a facsimile machine or device to send requests to the central controller.

At step S84, the central controller stores the customer information in the customer database (see FIG. 6C at Record R3) and assigns the customer a customer identifier number which is also stored in the customer database.

Thereafter, at step S8-5, the customer may be queried about the type and nature of the products that the customer desires to purchase. Additionally, the customer may be queried to provide preferences relating to tradeoffs for distance to a local merchant and price. For example, the customer might indicate that he will travel ten or more miles beyond his home or office to acquire a desired product if he can find a price that is 25% lower than the best price he has seen. Alternatively, the customer may specify that he is willing to pay more, say 10% more, for a particular product if he can acquire the same from a local merchant within one or just a few miles from his home or office. And, the customer might also specify preferences as to desired stores such as a willingness to pay more to shop at a NORD-STROM store versus a requirement to pay less if he is willing to shop at a CALDOR store.

In any case, it is also important to note that the central controller could be operated as a web site accessible via the Internet and world wide web. The central controller could be operated by a credit card issuer such as AMERICAN EXPRESS who could offer an Internet-based price establishment service as a benefit program for use only by its card holders. Such a card issuer based system could be configured, in addition to establishing prices on line, to allow purchasing of products on line. In that case, price establishment could be restricted by requiring use of the card-issuer's credit card and the like.

In any case, processing proceeds to Step S8-6, where the central controller queries its POS controller database (see FIG. 6B at Record R3) to determine retail stores in the customer's locality and, possibly, based on the customer's preferences as discussed above. Of course, the present invention may be configured in such a way that the central controller automatically generates location data based on the customer's zip code or on the customer's telephone number which may be obtained via well-known automatic systems such as caller-ID systems and the like.

In any case, at Step S8-7, the central controller queries a merchandise database (see FIG. 6A at Record R1) to determine the inventory available to the customer from the retail stores in the customer's locality and displays inventory data to the customer.

Of course, in producing and providing the virtual inventory to the customer, the central controller could be configured to display, possibly at the option of the customer, functional equivalents to customer choices. For example, a customer may enter a product such as a SONY 2-Head VCR having model or item number AR456 and the central controller could search its merchandise databases to determine other models from SONY or from other manufacturers that perform substantially the same functions as the customer's original request. Such other models can be included and displayed by the central controller in a list of inventory search results thereby broadening the purchase options available to the customer.

In addition to searching through the merchandise database maintained by the central controller to produce the virtual inventory listing to be presented to the customer on line, the present invention also contemplates and covers the case where real-time, store-based inventory queries may be implemented. In such a case, the central controller, after being presented with merchandise search criteria, could be configured to search the inventories of local stores to build the virtual inventory. Such inventory queries could be established as database queries (e.g., SQL queries) to be run against store-based inventories maintained by store or merchant systems such as a system connected to a POS controller and the like for a given store. The system shown in FIG. 1 can allow transfer of such queries and reception of inventory data related to the same via links 111-1, -2, and -3 coupling central controller 110 and POS controllers 116, 118, and 120, respectively.

In any case, at Step S8-8, the customer may browse the virtual inventory provided by the central controller, choose desired merchandise and agree to prices set by the manufacturer and displayed by the central controller.

In addition to displaying the virtual inventory, the central controller can also present corresponding stock-out statistics (e.g., projected future inventory levels based on historic sales rates) to the customer so that the customer knows, for example, that a certain store has eight VCRs left in inventory but that the same will probably be sold out by a certain time. Accordingly, the presentation of such stock-out statistics to the customer can motivate the customer to make a purchase on line thereby increasing impulse buying.

The prices set by the manufacturer and provided by the central controller to the customer online are intended to be the price that a local store will honor without exception. It is important to reiterate that it is the central controller that establishes the price that the local store, as described below, will honor when the customer visits the store for acquisition of his selected product(s). Additionally, the present invention allows the central controller to process a bid or counter-offer price from the customer on line. In such a case, the central controller can determine if the manufacturer will accept the customer's price and can establish the price based on the customer's bid or counter-offer price.

Thereafter, at Step S8-9, the customer can then send his credit card number (possibly via an SSL security enabled browser such as in the Netscape Navigator client). And, at Step S8-10, the customer may choose a local store or retail outlet from which to pick up his earlier selected merchandise.

Accordingly, at Step 8-11, the central controller creates a record in its transaction database (see FIG. 6D at Record R3).

Figure 8B:
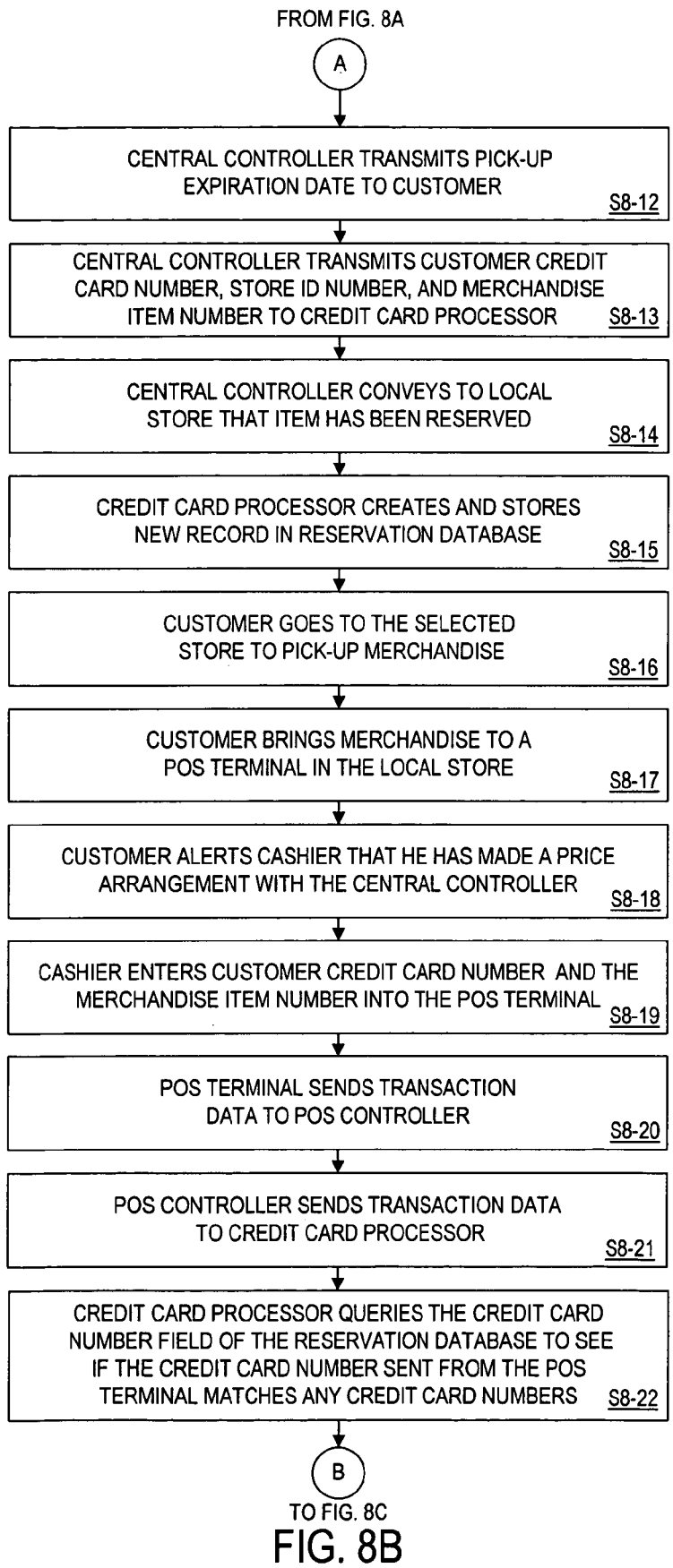
FIG. 8B is a continuation flowchart of the flowchart started in FIG. 8A.

Processing then proceeds as illustrated at the top of FIG. 8B.

At Step S8-12, the central controller transmits a pick up expiration notice including a valid price expiration date to the customer by displaying it on the web site or transmitting it to the user via electronic mail.

At Step S8-13, the central controller transmits the customer's credit card number, the store ID number, and the merchandise item number to a credit card processor for appropriate processing (see FIG. 7). This transmission, as described below, allows a credit card processor to create a record in its reservation database (FIG. 7). The reservation database can be used to drive an inventory holding system maintained by a merchant.

Of course, the transmission of the customer's credit card number could be replaced with another identifier such as a central controller assigned customer number as is shown in FIG. 6B (CUSTOMER ID NUMBER). Accordingly, the following references to credit card number for identification purposes also contemplate the use of another customer identification number. Further, the credit card processor could alternately comprise any appropriate service provider capable of storing the requisite information and transmitting it for use at the POS. The central controller for example may provide this service in lieu of the credit card processor.

It should also be noted that the use of a credit card to establish prices and to reserve an inventory item at a particular local store does not necessarily imply that the ultimate purchase transaction that may occur at the local store will utilize the customer's credit card number. The present invention uses the customer's credit card number as a reservation vehicle much like hotels use in reserving rooms in advance. At the time that the customer actually visits a store to purchase a particular item for which he received a set price from a central authority, the customer may present any form of tender (e.g., a personal check, a debit card, cash, or any other payment vehicle such as a store credit, gift certificate, etc.) to pay for the subject product. Additionally, the present invention contemplates the situation that a reservation of a product and the establishment of a price in one form of currency (e.g., U.S. dollars) does not require that the ultimate purchase transaction involve the same form of currency. For example, a U.S. customer or user may access a web site, receive a published, established price for a particular product, select a point of local pick up (e.g., at an airport in a foreign country), and pay for the product at the point of local pick up in a different, exchanged currency. Accordingly, it should be readily appreciated that the present invention contemplates a multiple or mixed payment modal type transaction. And, it should be clearly understood that the transaction involving the set price for a product can be treated separately and distinctly from the actual purchase transaction.

Next, at Step S8-14, the central controller conveys a reservation notice such as an electronic mail item or the like to the local store indicating that the item is to be reserved by the local store. That reservation notice may also take the form of an electronic message such as an electronic-data-interchange (EDI) document that notifies the merchant to place a hold on an inventory item and to keep it from general consumption and, specifically, held for the customer. Additionally, the reservation notice may also take the form of an electronic voice message produced from a voice notification unit or a facsimile message produced from an automatic facsimile device (e.g., a fax server).

Thereafter, the credit card processor stores a record in its reservation database (see FIG. 7 at Record R3) at Step S8-15.

After the customer confirms his desire to complete a purchase transaction at the local store (e.g., a purchase request notice), as noted at Step S8-16, the customer may then visit the local store he selected on line via the web to purchase and acquire his selected merchandise.

Of course, it should be noted that the present invention and the process depicted in the flowcharts now being described can accommodate real time or on line processing to effectuate an actual charge to the customer's credit card for the purchase of the selected merchandise at the price set in advance of pick up or acquisition of such merchandise from a local outlet. Additionally, rather than charging the customer the established price in real time, the difference between a store price and the established price could be made to appear as either a rebate on the customer's credit card bill or as a check that the central controller mails or otherwise delivers to the customer. In such a case, the central controller would post the purchase price, the store ID, and the customer's credit card number with the credit card processor and, in particular, in the credit card processor's reservation database (FIG. 7). When a transaction is made that matches a record in the reservation database of the credit card processor, the central controller could bill the store for the difference in price and possibly charge a transaction fee to either the customer's account or the store's account, and thereafter credit the difference to the customer and indicate the same on the customer's bill.

The preferred approach to concluding a credit card transaction according to the present invention is to have the merchant or local store process the charge at the point of sale to thereby allow the local store to realize an immediate revenue stream.

Once at the local store, the customer brings the merchandise (e.g., a new shirt) to a point-of-sale (POS) terminal (e.g., POS Terminal 114—FIG. 1) for purchase in the local store as indicated at Step S8-17. At Step S8-18, once at the POS terminal, the customer alerts the attendant that the customer made a purchase agreement in which he received a set price that was published by the central controller.

Thereafter, at Step S8-19, the attendant enters the customer's credit card number or other transaction identifier along with the merchandise item number (together "transaction data") into the POS terminal (e.g., card number 3333-3333-3333-3333 for Ms. Cardow who intended to purchase a Four Head VCR made by Sony having a product number of 4956323). And, at Step S8-20, the POS terminal transmits the transaction data to a POS controller maintained by the local store or some other authority.

It will be appreciated that the processes being described may be structured such that the attendant only enters the customer's credit card number and the store ID number into the POS terminal for processing and routing via the POS controller. The credit card number and the store ID number are sufficient to identify a reservation in the credit card processor's reservation database (FIG. 7). However, if more than one reservation exists for the customer (potentially at different stores), a credit card processor may operate to send a query for a merchandise item identifier to the store for display at the POS terminal and for specifying a particular reservation in the credit card processor's reservation database. Such options and implementation details will be readily appreciated by those skilled in the art of database design and implementation.

At Step S8-21, the POS controller sends the transaction data to the credit card processor for processing.

At Step S8-22, the credit card processor processes the transaction data by querying the credit card number field of its reservation database (FIG. 7) to see if the credit card number sent from the POS terminal and POS controller match any credit card numbers stored in the reservation database.

Figure 8C:
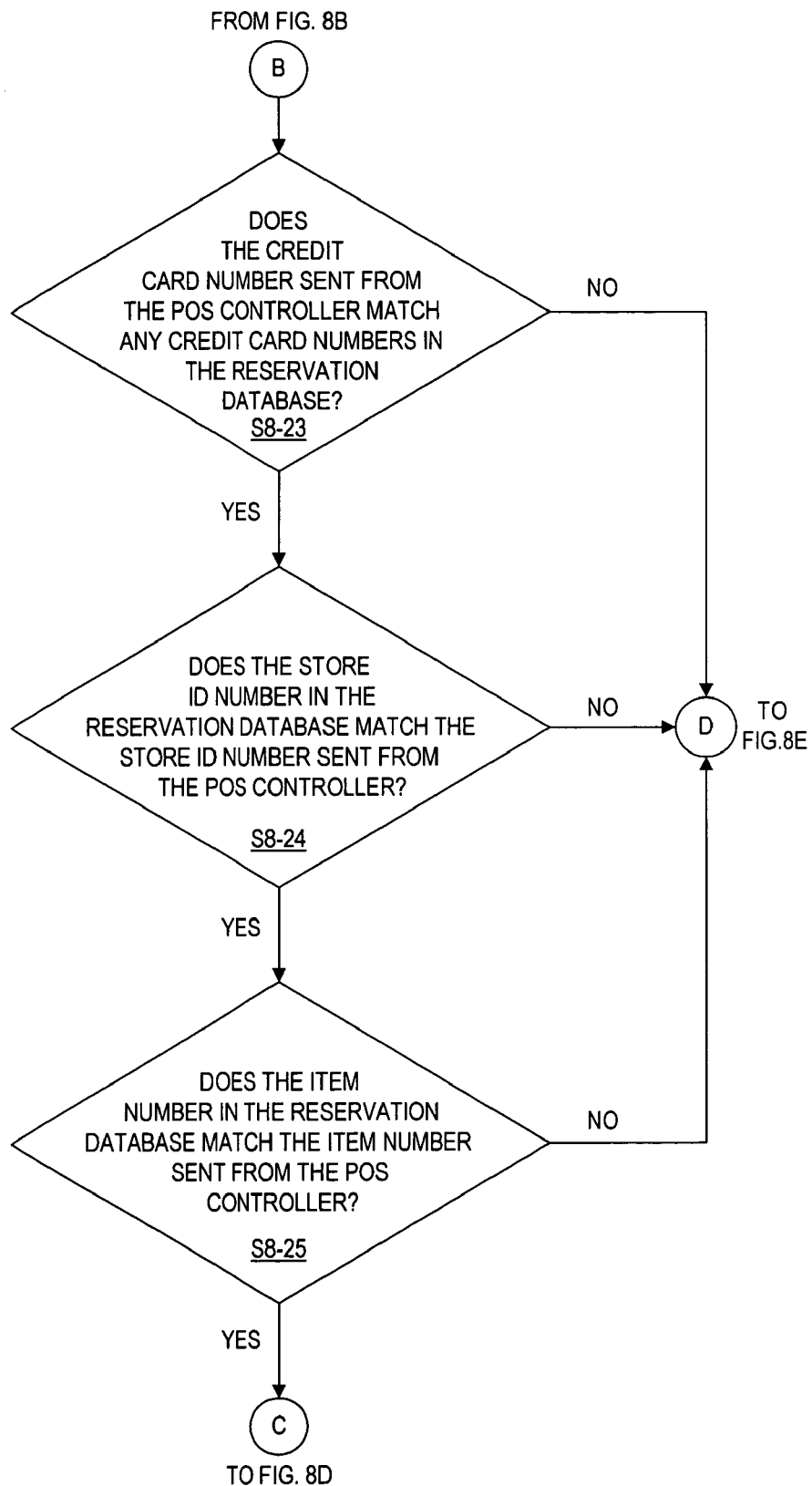
FIG. 8C is a continuation flowchart of the flowchart started in FIG. 8A.

Processing proceeds as indicated at the top of FIG. 8C.

At Step S8-23, the credit card processor queries the reservation database (FIG. 7) to determine if the credit card number sent from the POS controller matches any of the credit card numbers in the reservation database. If not, processing proceeds to Step S8-30 at the top of FIG. 8D.

If there is a match (i.e., the credit card number sent from the POS controller matches a reserved transaction in which the sale price was established on line by the central controller), then processing proceeds to Step S8-24.

At Step S8-24, the credit card processor queries the reservation database (FIG. 7) to determine if the store identification number in the reservation database matches the store identifier number sent from the POS controller. If not, processing proceeds to Step S8-30 at the top of FIG. 8D.

If there is a match (i.e., the store identification numbers match), then processing proceeds to Step S8-25. At Step S8-25, the credit card processor queries the reservation database (FIG. 7) to determine if the item number in the reservation database matches the item number sent from the POS controller. If not, processing proceeds to Step S8-30 at the top of FIG. 8E.

Figure 8D:
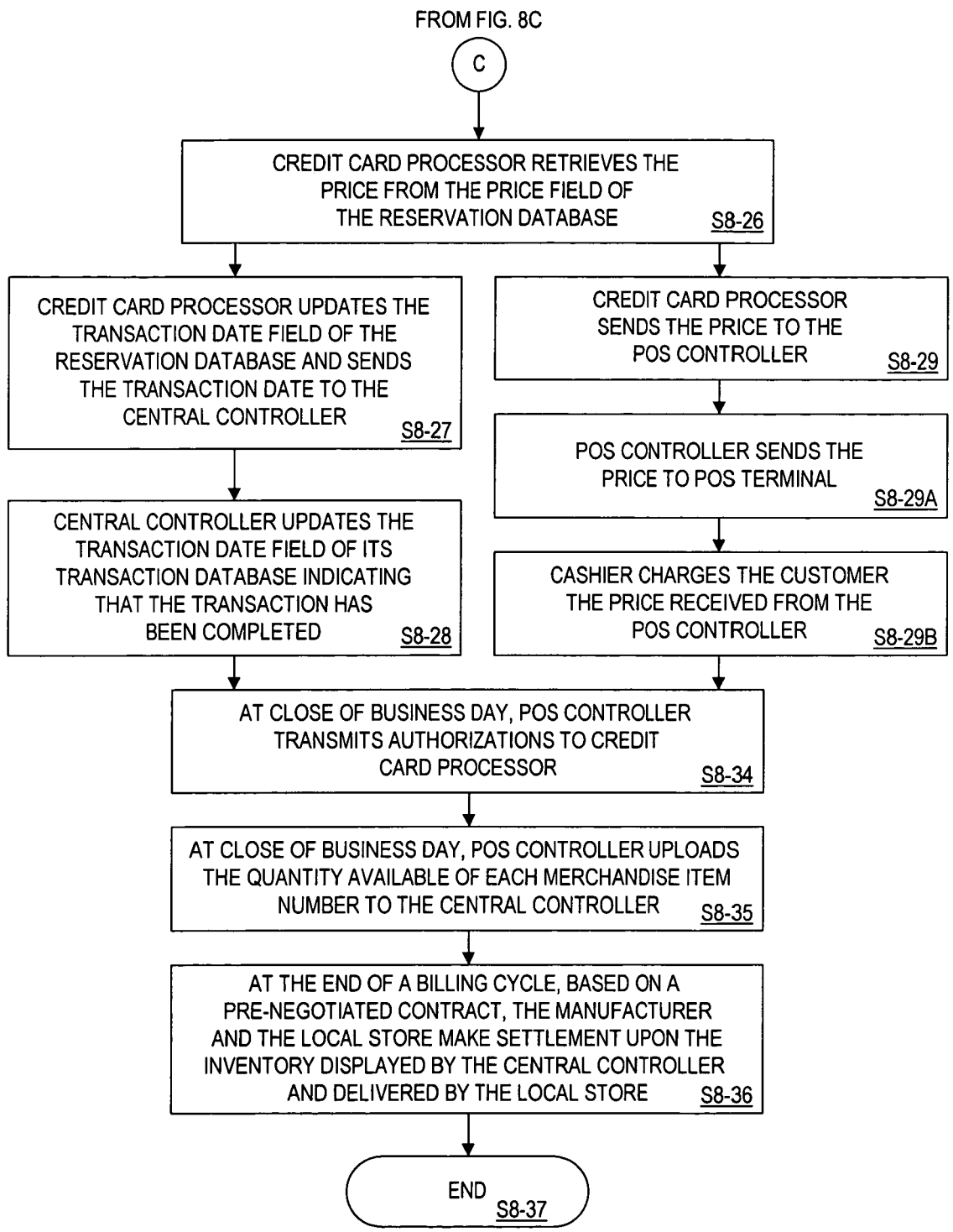
FIG. 8D is a continuation flowchart of the flowchart started in FIG. 8A.

If there is a match (i.e., the item numbers match), then processing proceeds to Step S8-26 at the top of FIG. 8D.

At Step 8-26, it has been determined that a reservation exists and, accordingly, the product purchase is to occur at the local store via the credit card processor and at the price that was established on line with the central controller. Accordingly, the credit card processor retrieves the previously established price for the item in question from the price field or column of the reservation database (FIG. 7).

The price retrieved from the credit card processor (i.e., the earlier established price) is sent by the credit card processor via the merchant's POS controller (or the POS controller that services the merchant) to the POS terminal.

Next, at Step S8-27, the credit card processor updates the transaction date field of the reservation database (FIG. 7) and sends the transaction date to the central controller.

Thereafter, processing proceeds to Step S8-28, where the central controller updates the transaction date field of its transaction database (FIG. 6D) indicating that the transaction has been completed.

Additionally, the process occurring after the execution of Step S8-26 requires that the credit card processor send the established price to the POS controller maintained by the local store as indicated at Step S8-29. Such communication is indicated in FIG. 1 via links 123 and 117-1, and phone network 122.

Also, at Step S8-29-A, the POS controller sends the established price to the POS terminal for processing and display. Such display will be done by the POS terminal if the same is equipped with a display device (e.g., the VERIFON TRANZ unit discussed above in regard to FIG. 1).

And, at Step S8-29-B, the cashier charges the customer the established price received from the POS controller maintained by the local store.

Next, processing proceeds to Step S8-34, where at the close of a business day, the POS controller transmits authorizations to the credit card processor. Thereafter, at Step S8-35, processing proceeds to Step S8-35, where at the close of a business day, the POS controller uploads quantity available data of each merchandise item number to the central controller.

And, finally, at Step S8-36 and at the end of a billing cycle, the central controller prompts the manufacturer to reconcile or settle for each item priced by the central controller and delivered by the local store based on a previously established contract between the manufacturer and the local store. Such a settlement will be readily understood and may include the payment of a price adjustment by the manufacturer to the local retailer. The previously negotiated contract may alternately allow for the provision of replacement inventory from the manufacturer to the retailer. In any case, the settlement as prompted is made from the manufacturer to the retailer so as to allow the local retailer to accept prices displayed by the central controller online.

Figure 8E:
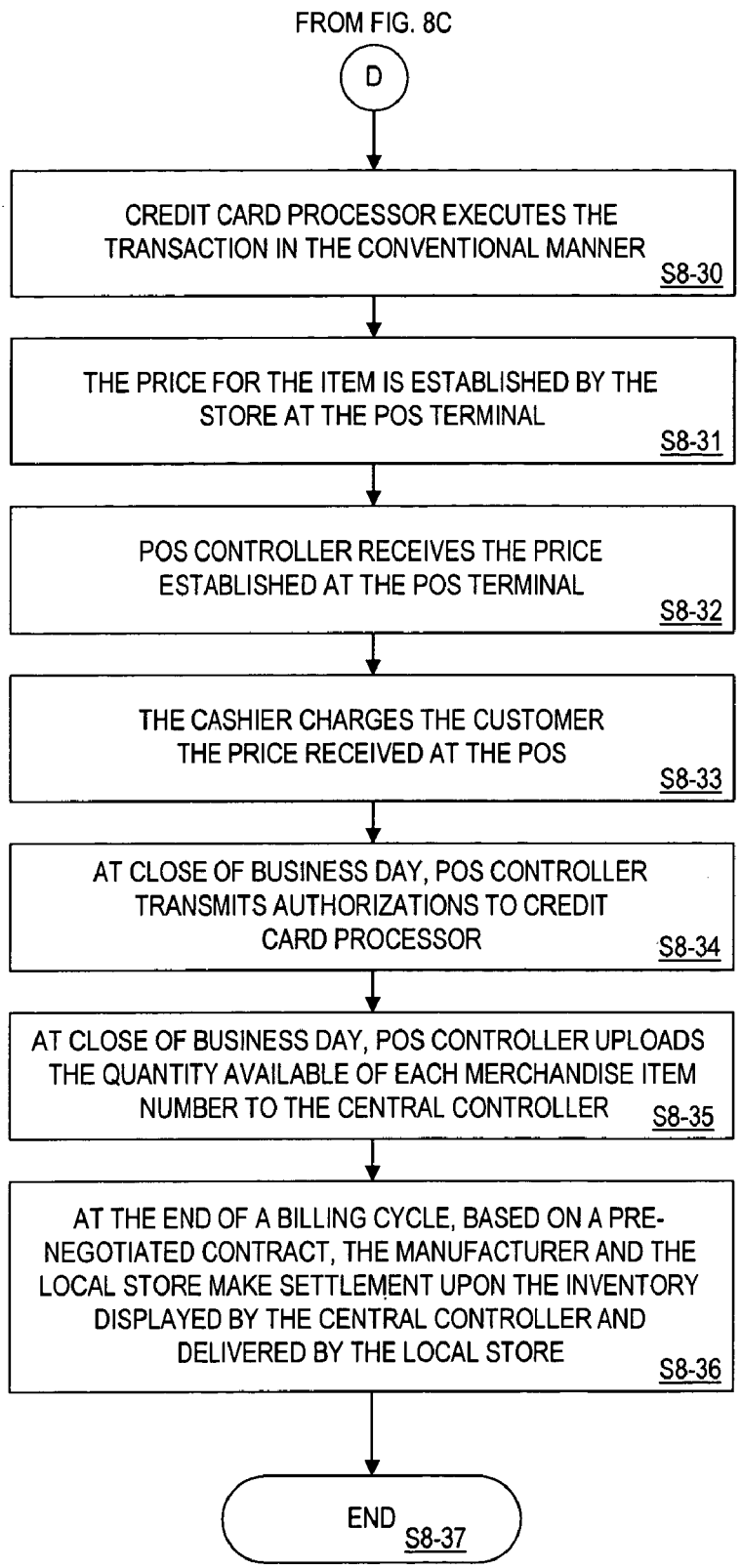
FIG. 8E is a conclusion flowchart of the flowcharts started and illustrated in FIGS. 8A, 8B, 8C, and 8D.

If the transaction was determined to be one not involving a reservation at Step S8-25 (i.e., one in which the price was not established by a central controller on line, but instead was set by the local store), processing proceeds to Step S8-30 at the top of FIG. 8E where the credit card processor executes the transaction in a conventional manner and based on the following steps being carried out within a system such as system 100.

FIG. 8E includes many of the process steps depicted in FIG. 8D. FIG. 8E represents a process carried out as a result of a decisional branch that occurred at Step S8-25 as shown in FIG. 8C. Accordingly, for sake of brevity duplicative process steps will not be mentioned nor described again.

At Step S8-31, the price is retrieved at the POS terminal and, at Step S8-31, the price for the merchandise is established at the point-of-sale.

Next, at Step S8-32, the POS processor receives the price established at the point-of-sale and routes the same for processing in a conventional manner.

At Step S8-33, the attendant or cashier presents a charge slip to the customer indicating the price established at the point of sale and processed in a conventional manner.

Thereafter, processing proceeds to the sequence found at Steps S8-34, S8-35, and S8-36 which were described above.

Processing ends at Step S8-37.

In view of the foregoing discussions pertaining to the flowchart illustrated in FIGS. 8A–8E, It will be understood that a system such as system 100 enables the manufacturer to establish product prices online independently of the retail process. The prices established online are then honored by local merchants of a customer's choice to allow local purchase and pickup of products. As such, the retailer will realize a valuable cash flow as a result of the transaction.

Moreover, it will now be readily appreciated that the present invention provides a system and a process that enables a customer to search and examine electronic, virtual product inventories on line, receive a price for a particular product that was established by a manufacturer, and purchase and acquire that product from a retailer or outlet of the customer's choice at the price received on line. Moreover, the customer can pick up the item without waiting for shipment or delivery. This new paradigm for the sale and distribution of products will benefit manufactures, distributors, and consumers in ways not heretofore realized.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A method, comprising:
receiving transaction information, the transaction information being associated with (i) a buyer who arranges to purchase a product at a first price and (ii) a merchant that offers the product for sale at a second price different from the first price; and
transmitting information that enables the buyer to physically acquire the product at a location associated with the merchant in exchange for providing payment of an amount based on the first price,
wherein the buyer provides payment of an amount based on the first price to the merchant, and at least one of a central controller and a processing device operating on behalf of a third party causes payment of an amount based on the difference between the first price and the second price to be provided to the merchant.

2. A method, comprising:
receiving transaction information, the transaction information being associated with (i) a buyer who arranges to purchase a product at a first price and (ii) a merchant that offers the product for sale at a second price different from the first price; and
transmitting information that enables the buyer to physically acquire the product at a location associated with the merchant in exchange for providing payment of an amount based on the first price,
wherein the buyer provides payment of an amount based on the first price to a central controller, and the central controller provides payment of an amount based on the second price to the merchant.

3. The method of claim 2, wherein a third party provides payment of an amount based on the difference between the first price and the second price to the central controller.

4. The method of claim 2, further comprising:
arranging for the buyer to purchase the product at the first price.

5. The method of claim 4, wherein said arranging comprises:
arranging for the buyer to provide payment of an amount based on the first price using payment information received via the communication network.

6. The method of claim 4, wherein said arranging comprises:
associating an indication of the first price with the buyer.

7. The method of claim 2, wherein said receiving comprises receiving transaction information from the merchant, and said transmitting comprises transmitting information to the merchant.

8. The method of claim 2, wherein the transaction information comprises a transaction identifier.

9. The method of claim 2, wherein the transaction information comprises a product identifier.

10. The method of claim 2, wherein the transaction information comprises a customer identifier.

11. The method of claim 2, wherein the transaction information comprises a merchant identifier.

12. The method of claim 2, wherein the transaction information comprises a credit card account number.

13. The method of claim 2, wherein said receiving and said transmitting are associated with a central controller.

14. The method of claim 2, wherein said receiving and said transmitting are associated with a credit card processor.

15. The method of claim 2, wherein the information that allows the buyer to acquire the product from the merchant comprises an indication of the first price.

16. The method of claim 2, wherein at least one of said receiving and said transmitting comprise exchanging information with a central controller.

17. The method of claim 2, wherein at least one of said receiving and said transmitting comprise exchanging information with a merchant device.

18. The method of claim 17, wherein the merchant device comprises a point of sale terminal.

19. The method of claim 2, wherein at least one of said receiving and said transmitting comprise exchanging information with a payment account processor.

20. The method of claim 19, wherein the payment account processor comprises at least one of: (i) a credit card processor, (ii) a debit card processor, and (iii) a checking account processor.

21. The method of claim 2, wherein at least one of said receiving and said transmitting are associated with a central controller.

22. The method of claim 2, wherein at least one of said receiving and said transmitting are associated with the merchant.

23. The method of claim 2, wherein at least one of said receiving and said transmitting are associated with a payment account processor.

24. The method of claim 23, wherein the payment account processor comprises at least one of: (i) a credit card processor, (ii) a debit card processor and (iii) a checking account processor.

25. The method of claim 2, wherein the transaction information comprises at least one of: (i) a payment account number, (ii) a debit card account number, and (iii) a checking account number.

26. A method, comprising:
receiving, via a Web site, from a buyer a selection of a product and an indication of a willingness to acquire the product from a merchant;
establishing for the buyer a first price for the product, wherein the merchant offers the product for sale at a second price different from the first price;
arranging via the Web site for the buyer to purchase the product;
receiving a transaction identifier;
receiving a product identifier that identifies the product;
determining whether the transaction identifier is associated with the product;
arranging for the buyer to provide the first price for the product if the transaction identifier is associated with the product;
arranging for the buyer to provide the second price for the product if the transaction identifier is not associated with the product; and
transmitting information that enables the buyer to physically acquire the product at a location associated with the merchant,
wherein the buyer provides payment of an amount based on the first price to a central controller, and the central controller provides payment of an amount based on the second price to the merchant.

27. A method, comprising:
receiving, via a Web site, from a buyer a selection of a product and an indication of a willingness to acquire the product from a merchant;
establishing for the buyer a first price for the product, wherein the merchant offers the product for sale at a second price different from the first price;
arranging via the Web site for the buyer to purchase the product;

receiving a transaction identifier;
receiving a product identifier via a POS terminal, the product identifier identifying the product;
determining whether the transaction identifier is associated with the product;
arranging for the buyer to provide the first price for the product if the transaction identifier is associated with the product;
arranging for the buyer to provide the second price for the product if the transaction identifier is not associated with the product; and
transmitting information that enables the buyer to physically acquire the product at a location associated with the merchant,
    wherein the buyer provides payment of an amount based on the first price to a central controller, and the central controller provides payment of an amount based on the second price to the merchant.

28. A method, comprising:
receiving from a buyer a selection of a product via a Web site;
establishing for the buyer a first price for the product, wherein a merchant offers the product for sale at a second price different from the first price;
arranging via the Web site for the buyer to purchase the product;
receiving a transaction identifier;
receiving a product identifier that identifies the product;
searching a database for a record that corresponds to the transaction identifier;
determining a second product identifier from the record; and
determining whether the second product identifier is associated with the product;
arranging for the buyer to provide the first price for the product if the second identifier is associated with the product;
arranging for the buyer to provide the second price for the product if the second identifier is not associated with the product; and
transmitting information that enables the buyer to acquire the product at a location associated with the merchant,
    wherein the buyer provides payment of an amount based on the first price to a central controller, and the central controller provides payment of an amount based on the second price to the merchant.

29. A method, comprising:
receiving via a Web site a request to purchase a product and an indication of a willingness to acquire the product, wherein a merchant offers the product for sale at a second price different from a first price;
storing in a database a record that indicates:
  a product identifier that identifies the product,
  the first price for the product, and
  a first transaction identifier that uniquely identifies the record;
receiving via a POS terminal:
  a product identifier, and
  a second transaction identifier;
determining whether the second transaction identifier matches the first transaction identifier;
arranging for the buyer to provide the first price for the product if the second transaction identifier matches the first transaction identifier;
arranging for the buyer to provide the second price for the product if the second transaction identifier does not match the first transaction identifier; and
transmitting information that enables the buyer to physically acquire the product at a location associated with the merchant,
    wherein the buyer provides payment of an amount based on the first price to a central controller, and the central controller provides payment of an amount based on the second price to the merchant.

30. A method, comprising:
receiving a product identifier that identifies a product presented for purchase, wherein a merchant offers the product for sale at a second price different from a first price;
receiving a transaction identifier from a buyer;
determining whether the transaction identifier identifies a record of a database, the database storing a plurality of records, each record being associated with a transaction and indicating a first product purchased in the transaction at the first price that the buyer had arranged to purchase;
determining, if the transaction identifier indicates a record of the database, from the indicated record a first product and the first price for the first product;
determining whether the product presented for purchase is the first product;
arranging for the buyer to provide the first price if the product presented for purchase is the first product indicated by the transaction identifier;
determining the second price for the product if the product presented for purchase is not indicated by the transaction identifier;
arranging for the buyer to provide the second price if the product presented for purchase is not indicated by the transaction identifier; and
transmitting information that enables the buyer to physically acquire the product at a location associated with the merchant,
    wherein the buyer provides payment of an amount based on the first price to a central controller, and the central controller provides payment of an amount based on the second price to the merchant.

31. A method, comprising:
receiving transaction information, the transaction information being associated with (i) a buyer who arranges to purchase a product at a first price and (ii) a merchant that offers identical products for sale at a second price different from the first price; and
transmitting information that enables the buyer to acquire the product at a location associated with the merchant in exchange for providing payment of an amount based on the first price,
    wherein the buyer provides payment of an amount based on the first price to the merchant, and at least one of a central controller and a processing device operating on behalf of a third party causes payment of an amount based on the difference between the first price and the second price to be provided to the merchant.

* * * * *